(12) United States Patent
Tomioka

(10) Patent No.: US 7,450,315 B2
(45) Date of Patent: Nov. 11, 2008

(54) ZOOM LENS

(75) Inventor: Ukyo Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/806,936

(22) Filed: Jun. 5, 2007

(65) Prior Publication Data
US 2007/0279762 A1    Dec. 6, 2007

(30) Foreign Application Priority Data
Jun. 6, 2006    (JP) .......................... P 2006-157097

(51) Int. Cl.
G02B 15/14    (2006.01)
(52) U.S. Cl. ...................... 359/687; 359/686
(58) Field of Classification Search .................. 359/686, 359/687
See application file for complete search history.

(56) References Cited

U.S. PATENT DOCUMENTS 4,398,807 A * 8/1983 Iizuka .......................... 359/687
6,404,561 B1 6/2002 Isono et al.
2005/0280901 A1 12/2005 Tomioka

FOREIGN PATENT DOCUMENTS

| JP | 63-278013 A | 11/1988 |
|---|---|---|
| JP | 6-324265 A | 11/1994 |
| JP | 2000 147379 A | 5/2000 |
| JP | 2001-194590 A | 7/2001 |
| JP | 3391342 B2 | 1/2003 |
| JP | 2006-3589 A | 1/2006 |
| JP | 2003 121738 A | 4/2006 |

* cited by examiner

*Primary Examiner*—William C Choi
(74) *Attorney, Agent, or Firm*—Birch, Stewart, Kolasch & Birch, LLP

(57) ABSTRACT

A zoom lens includes, in order from an object side, a first group having a positive refractive power, a second group having a negative refractive power, a diaphragm, a third group having a positive refractive and a fourth group following the third group. When a power of the zoom lens varies from a wide-angle end to a telephoto end, the second group is moved along an optical axis toward an image side with the first and third groups fixed to the optical axis so as to vary the power and the fourth group is moved along the optical axis to perform correction of a position of the image plane, which is associated with the variation of the power, and focusing.

16 Claims, 31 Drawing Sheets

EXAMPLE 1

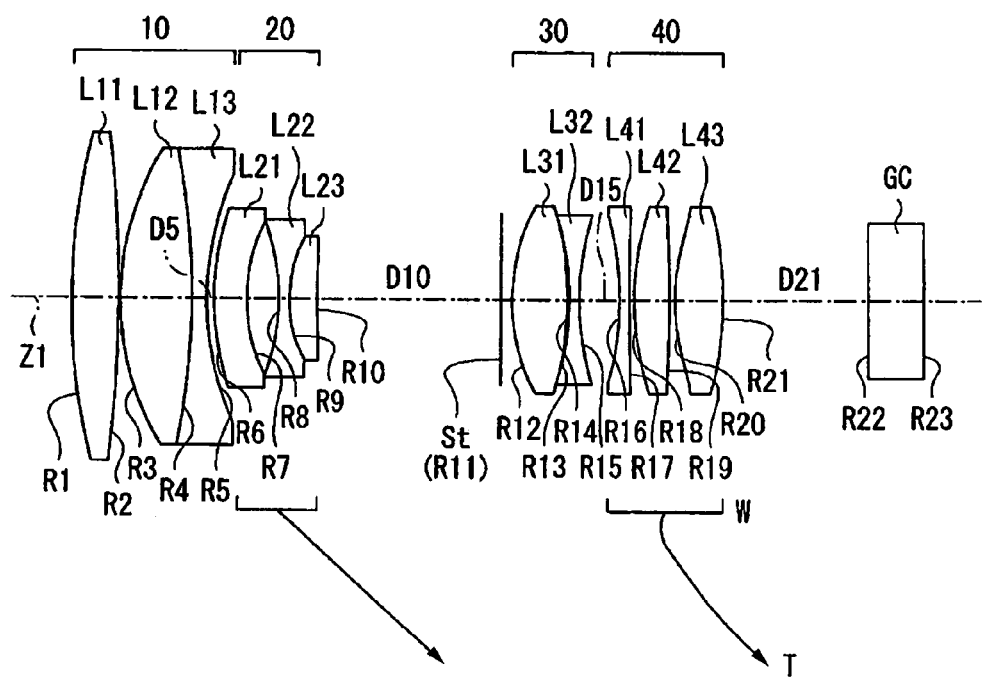
FIG. 1 EXAMPLE 1
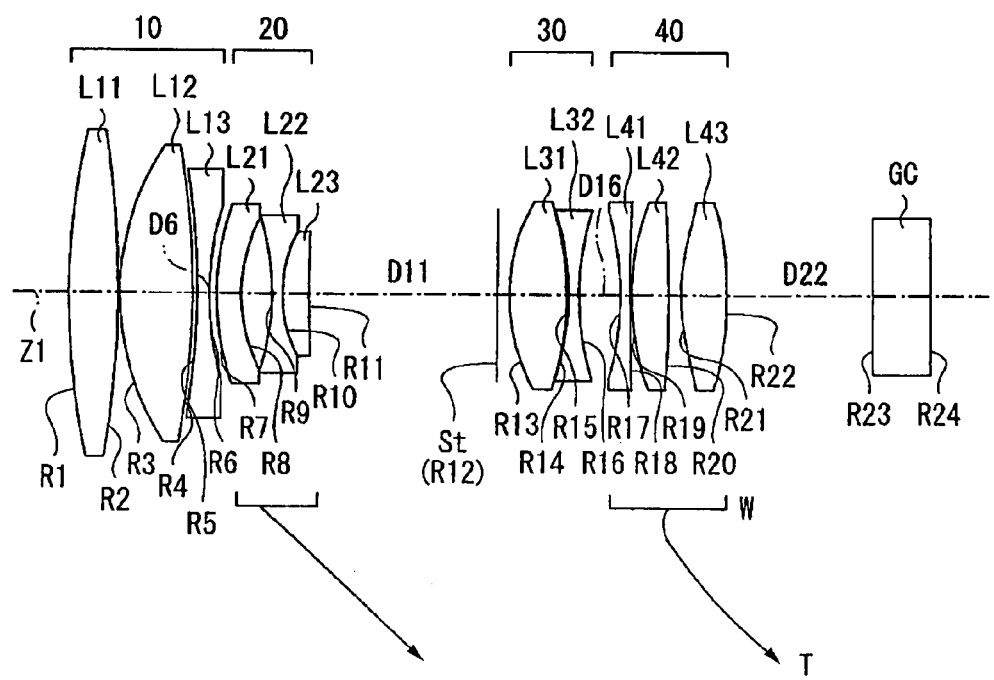
FIG. 2 EXAMPLE 2

EXAMPLE 3

EXAMPLE 4

EXAMPLE 5

EXAMPLE 6

EXAMPLE 7

EXAMPLE 8

FIG. 9

| | EXAMPLE 1 BASIC LENS DATA | | | |
|---|---|---|---|---|
| Si<br>SURFACE NUMBER | Ri<br>CURVATURE RADIUS | Di<br>DISTANCE BETWEEN SURFACES | Ndj<br>REFRACTIVE INDEX | νdj<br>ABBE NUMBER |
| 1 | 41.3741 | 3.29 | 1.72916 | 54.7 |
| 2 | −80.1350 | 0.10 | | |
| 3 | 17.3162 | 4.94 | 1.49700 | 81.6 |
| 4 | −42.7051 | 1.00 | 1.62004 | 36.3 |
| 5 | 18.2979 | D5 (VARIABLE) | | |
| 6 | 16.8318 | 2.30 | 1.67003 | 47.3 |
| 7 | 9.9438 | 2.29 | | |
| 8 | −13.1203 | 0.70 | 1.80610 | 33.3 |
| 9 | 7.7501 | 1.97 | 1.92286 | 20.9 |
| 10 | 63.1163 | D10 (VARIABLE) | | |
| 11 (DIAPHRAGM) | — | 0.80 | | |
| 12 | 11.8985 | 3.86 | 1.72916 | 54.7 |
| 13 | −18.8648 | 0.12 | | |
| 14 | −16.4697 | 0.70 | 1.67270 | 32.1 |
| 15 | 16.4697 | D15 (VARIABLE) | | |
| 16 | −17.8536 | 0.70 | 1.67270 | 32.1 |
| 17 | 173.9062 | 0.35 | | |
| 18 | 16.6712 | 2.57 | 1.49700 | 81.6 |
| 19 | −87.7876 | 0.38 | | |
| *20 | 12.1984 | 3.43 | 1.58913 | 61.2 |
| *21 | −21.6014 | D21 (VARIABLE) | | |
| 22 | ∞ | 4.00 | 1.51680 | 64.2 |
| 23 | ∞ | | | |

(* ASPHERIC )

FIG. 10A

| ASPHERIC SURFACE FACTOR | EXAMPLE 1 ASPHERIC SURFACE DATA ||
|---|---|---|
| | SURFACE NUMBER ||
| | 20TH SURFACE | 21ST SURFACE |
| K | 9.18553E-01 | 1.01129E+00 |
| $A_3$ | 4.97127E-04 | 7.28322E-04 |
| $A_4$ | -3.83361E-04 | -2.10453E-04 |
| $A_5$ | 1.53323E-06 | 2.09609E-05 |
| $A_6$ | 1.09527E-06 | 1.13353E-06 |
| $A_7$ | -1.41209E-08 | -2.01023E-07 |
| $A_8$ | -2.57292E-08 | -4.41344E-08 |
| $A_9$ | -4.20416E-09 | -4.30904E-09 |
| $A_{10}$ | -5.53321E-10 | -3.79916E-10 |
| $A_{11}$ | -4.42195E-11 | -2.01220E-11 |
| $A_{12}$ | -3.10054E-12 | -3.52617E-13 |
| $A_{13}$ | -8.20377E-14 | 7.93474E-14 |
| $A_{14}$ | -8.97383E-16 | 2.43751E-14 |
| $A_{15}$ | -4.33105E-15 | 4.57117E-15 |
| $A_{16}$ | -2.09306E-15 | 2.54787E-16 |
| $A_{17}$ | -5.96548E-16 | 7.43956E-17 |
| $A_{18}$ | -1.10625E-16 | 2.06575E-16 |
| $A_{19}$ | 1.10278E-16 | -7.91729E-18 |
| $A_{20}$ | -7.55517E-18 | 1.57259E-18 |

FIG. 10B

| EXAMPLE 1 DATA RELATING TO ZOOMING |||||||
|---|---|---|---|---|---|---|
| | FOCAL LENGTH f | FNO. | ANGLE OF VIEW $(2\omega)$ | D5 | D10 | D15 | D21 |
| WIDE END | 15.13 | 1.53 | 24.6 | 0.50 | 12.91 | 2.95 | 10.00 |
| TELE END | 49.03 | 2.55 | 7.0 | 12.30 | 1.12 | 8.52 | 4.43 |

FIG. 11

| | EXAMPLE 2 BASIC LENS DATA | | | |
|---|---|---|---|---|
| Si<br>SURFACE NUMBER | Ri<br>CURVATURE RADIUS | Di<br>DISTANCE BETWEEN SURFACES | Ndj<br>REFRACTIVE INDEX | $\nu$dj<br>ABBE NUMBER |
| 1 | 45.0300 | 3.36 | 1.62041 | 60.3 |
| 2 | -63.0547 | 0.10 | | |
| 3 | 16.0228 | 5.05 | 1.49700 | 81.6 |
| 4 | -51.1671 | 0.30 | | |
| 5 | -46.7919 | 0.81 | 1.62004 | 36.3 |
| 6 | 18.4386 | D6 (VARIABLE) | | |
| 7 | 16.2141 | 1.73 | 1.67003 | 47.3 |
| 8 | 10.3208 | 2.13 | | |
| 9 | -14.4771 | 0.70 | 1.80610 | 33.3 |
| 10 | 8.3418 | 1.84 | 1.92286 | 18.9 |
| 11 | 46.5895 | D11 (VARIABLE) | | |
| 12 (DIAPHRAGM) | — | 0.80 | | |
| 13 | 11.8191 | 3.90 | 1.72916 | 54.7 |
| 14 | -18.1343 | 0.15 | | |
| 15 | -15.5586 | 0.70 | 1.67270 | 32.1 |
| 16 | 16.8962 | D16 (VARIABLE) | | |
| 17 | -17.3987 | 0.70 | 1.67270 | 32.1 |
| 18 | 130.3667 | 0.11 | | |
| 19 | 15.8818 | 2.66 | 1.49700 | 81.6 |
| 20 | -76.2821 | 0.86 | | |
| *21 | 12.3789 | 3.24 | 1.58913 | 61.2 |
| *22 | -21.6306 | D22 (VARIABLE) | | |
| 23 | ∞ | 4.00 | 1.51680 | 64.2 |
| 24 | ∞ | | | |

(* ASPHERIC )

FIG. 12A

| EXAMPLE 2 ASPHERIC SURFACE DATA | | |
|---|---|---|
| ASPHERIC SURFACE FACTOR | SURFACE NUMBER | |
| | 21ST SURFACE | 22ND SURFACE |
| K | 9.16927E-01 | 1.01107E+00 |
| $A_3$ | 4.73051E-04 | 6.22047E-04 |
| $A_4$ | -3.96077E-04 | -2.02958E-04 |
| $A_5$ | 1.44828E-06 | 2.19563E-05 |
| $A_6$ | 1.20664E-06 | 1.14407E-06 |
| $A_7$ | -2.06401E-09 | -2.04965E-07 |
| $A_8$ | -2.46645E-08 | -4.45530E-08 |
| $A_9$ | -4.13525E-09 | -4.32191E-09 |
| $A_{10}$ | -5.46963E-10 | -3.78188E-10 |
| $A_{11}$ | -4.35973E-11 | -1.97235E-11 |
| $A_{12}$ | -3.01249E-12 | -2.87678E-13 |
| $A_{13}$ | -7.17796E-14 | 8.65641E-14 |
| $A_{14}$ | 5.20022E-16 | 2.52879E-14 |
| $A_{15}$ | -4.17985E-15 | 4.66008E-15 |
| $A_{16}$ | -2.07390E-15 | 2.65354E-16 |
| $A_{17}$ | -5.94659E-16 | 7.53840E-17 |
| $A_{18}$ | -1.10401E-16 | 2.06700E-16 |
| $A_{19}$ | 1.10299E-16 | -7.90345E-18 |
| $A_{20}$ | -7.55279E-18 | 1.57359E-18 |

FIG. 12B

| EXAMPLE 2 DATA RELATING TO ZOOMING | | | | | | | |
|---|---|---|---|---|---|---|---|
| | FOCAL LENGTH f | FNO. | ANGLE OF VIEW ($2\omega$) | D6 | D11 | D16 | D22 |
| WIDE END | 15.13 | 1.53 | 24.2 | 0.50 | 13.30 | 2.94 | 10.00 |
| TELE END | 49.01 | 2.55 | 7.0 | 12.63 | 1.17 | 8.41 | 4.53 |

FIG. 13

| | | EXAMPLE 3 BASIC LENS DATA | | | |
|---|---|---|---|---|---|
| | Si<br>SURFACE NUMBER | Ri<br>CURVATURE RADIUS | Di<br>DISTANCE BETWEEN SURFACES | Ndj<br>REFRACTIVE INDEX | νdj<br>ABBE NUMBER |
| 10 | 1 | 46.5297 | 3.23 | 1.72916 | 54.7 |
| | 2 | −79.5544 | 0.10 | | |
| | 3 | 16.6009 | 4.90 | 1.49700 | 81.6 |
| | 4 | −52.8836 | 1.00 | 1.62004 | 36.3 |
| | 5 | 18.0595 | D5 (VARIABLE) | | |
| 20 | 6 | 15.9434 | 2.35 | 1.71300 | 53.9 |
| | 7 | 9.9146 | 2.25 | | |
| | 8 | −13.9357 | 0.70 | 1.80610 | 33.3 |
| | 9 | 8.2735 | 2.01 | 1.92286 | 20.9 |
| | 10 | 64.7606 | D10 (VARIABLE) | | |
| | 11 (DIAPHRAGM) | — | 0.80 | | |
| 30 | *12 | 11.8726 | 3.76 | 1.72916 | 54.7 |
| | *13 | −24.6031 | 0.14 | | |
| | 14 | −25.3538 | 0.70 | 1.69895 | 30.1 |
| | 15 | 15.8323 | D15 (VARIABLE) | | |
| 40 | 16 | −18.2813 | 0.70 | 1.67270 | 32.1 |
| | 17 | 184.2848 | 0.38 | | |
| | 18 | 16.4938 | 2.70 | 1.49700 | 81.6 |
| | 19 | −86.2645 | 0.28 | | |
| | *20 | 12.3465 | 3.42 | 1.58913 | 61.2 |
| | *21 | −22.7395 | D21 (VARIABLE) | | |
| GC | 22 | ∞ | 4.00 | 1.51680 | 64.2 |
| | 23 | ∞ | | | |

(*: ASPHERIC)

FIG. 14A

| EXAMPLE 3 ASPHERIC SURFACE DATA | | | | |
|---|---|---|---|---|
| ASPHERIC SURFACE FACTOR | SURFACE NUMBER | | | |
| | 12TH SURFACE | 13TH SURFACE | 20TH SURFACE | 21ST SURFACE |
| $K$ | 9.48697E-01 | 1.24701E-01 | 9.31621E-01 | 9.67080E-01 |
| $A_3$ | 2.38286E-04 | 4.17235E-04 | 7.02998E-04 | 8.20619E-04 |
| $A_4$ | 1.70396E-06 | 2.39354E-05 | -3.66946E-04 | -1.85024E-04 |
| $A_5$ | 3.90403E-09 | -2.55543E-06 | 5.09485E-06 | 2.02603E-05 |
| $A_6$ | -1.63485E-07 | -6.70621E-07 | 1.21890E-06 | 1.09018E-06 |
| $A_7$ | -3.50214E-08 | -6.46246E-08 | -3.95616E-08 | -1.94151E-07 |
| $A_8$ | -4.27152E-09 | 7.21733E-10 | -3.21917E-08 | -4.35983E-08 |
| $A_9$ | -1.64902E-10 | 1.43248E-09 | -5.14441E-09 | -4.58108E-09 |
| $A_{10}$ | 1.13157E-10 | 5.33801E-10 | -6.74301E-10 | -4.90579E-10 |
| $A_{11}$ | 4.36453E-11 | 1.03252E-10 | -5.44542E-11 | -4.81262E-11 |
| $A_{12}$ | 1.07957E-11 | 1.78560E-11 | -2.83542E-12 | -6.16580E-12 |
| $A_{13}$ | 2.16819E-12 | 2.93393E-12 | 3.38247E-13 | -9.18552E-13 |
| $A_{14}$ | 3.74417E-13 | 4.76148E-13 | 1.33079E-13 | -1.09162E-13 |
| $A_{15}$ | 5.62849E-14 | 7.45331E-14 | 2.60200E-14 | -2.10973E-15 |
| $A_{16}$ | 7.40971E-15 | 1.08586E-14 | 3.14389E-15 | 3.63815E-15 |
| $A_{17}$ | 5.89906E-16 | 1.73405E-15 | 1.54024E-17 | 2.12461E-15 |
| $A_{18}$ | -5.94516E-17 | 1.05222E-16 | -1.58219E-16 | 1.10400E-15 |
| $A_{19}$ | -7.03282E-17 | -7.63258E-17 | 9.68351E-17 | 2.89909E-16 |
| $A_{20}$ | -3.84944E-18 | -3.12855E-17 | -5.66741E-18 | -6.61420E-17 |

FIG. 14B

| EXAMPLE 3 DATA RELATING TO ZOOMING | | | | | | | |
|---|---|---|---|---|---|---|---|
| | FOCAL LENGTH $f$ | FNO. | ANGLE OF VIEW ($2\omega$) | D5 | D10 | D15 | D21 |
| WIDE END | 15.13 | 1.45 | 24.8 | 0.50 | 13.38 | 3.06 | 10.00 |
| TELE END | 49.03 | 2.51 | 7.2 | 12.75 | 1.13 | 8.71 | 4.35 |

FIG. 15

| | EXAMPLE 4 BASIC LENS DATA | | | |
|---|---|---|---|---|
| Si<br>SURFACE NUMBER | Ri<br>CURVATURE RADIUS | Di<br>DISTANCE BETWEEN SURFACES | Ndj<br>REFRACTIVE INDEX | $\nu$dj<br>ABBE NUMBER |
| 1 | 41.0481 | 3.32 | 1.71300 | 53.9 |
| 2 | -78.5585 | 0.10 | | |
| 3 | 17.3818 | 4.96 | 1.51633 | 64.1 |
| 4 | -43.1657 | 1.00 | 1.63980 | 34.5 |
| 5 | 18.2524 | D5 (VARIABLE) | | |
| 6 | 16.8111 | 2.32 | 1.67003 | 47.3 |
| 7 | 9.9446 | 2.29 | | |
| 8 | -13.1036 | 0.70 | 1.80610 | 33.3 |
| 9 | 7.7588 | 1.98 | 1.92286 | 20.9 |
| 10 | 62.5275 | D10 (VARIABLE) | | |
| 11 (DIAPHRAGM) | — | 0.80 | | |
| 12 | 11.8807 | 3.91 | 1.69680 | 55.5 |
| 13 | -18.7933 | 0.12 | | |
| 14 | -16.5298 | 0.72 | 1.62004 | 36.3 |
| 15 | 16.4838 | D15 (VARIABLE) | | |
| 16 | -17.8921 | 0.70 | 1.72825 | 28.5 |
| 17 | 178.9155 | 0.30 | | |
| 18 | 16.6486 | 2.57 | 1.51633 | 64.1 |
| 19 | -87.2679 | 0.23 | | |
| *20 | 12.1716 | 3.48 | 1.58913 | 61.2 |
| *21 | -21.5886 | D21 (VARIABLE) | | |
| 22 | ∞ | 4.00 | 1.51680 | 64.2 |
| 23 | ∞ | | | |

(* ASPHERIC)

FIG. 16A

| EXAMPLE 4 ASPHERIC SURFACE DATA | | |
|---|---|---|
| ASPHERIC SURFACE FACTOR | SURFACE NUMBER | |
| | 20TH SURFACE | 21ST SURFACE |
| K | 9.18121E-01 | 1.01128E+00 |
| $A_3$ | 4.79593E-04 | 7.49406E-04 |
| $A_4$ | -3.85211E-04 | -2.09992E-04 |
| $A_5$ | 1.32442E-06 | 2.09986E-05 |
| $A_6$ | 1.06944E-06 | 1.14079E-06 |
| $A_7$ | -1.62266E-08 | -2.00417E-07 |
| $A_8$ | -2.59065E-08 | -4.41064E-08 |
| $A_9$ | -4.21381E-09 | -4.31159E-09 |
| $A_{10}$ | -5.53671E-10 | -3.80798E-10 |
| $A_{11}$ | -4.41898E-11 | -2.02508E-11 |
| $A_{12}$ | -3.09117E-12 | -3.71516E-13 |
| $A_{13}$ | -8.07282E-14 | 7.73283E-14 |
| $A_{14}$ | -7.09787E-16 | 2.41260E-14 |
| $A_{15}$ | -4.31121E-15 | 4.54744E-15 |
| $A_{16}$ | -2.09063E-15 | 2.52084E-16 |
| $A_{17}$ | -5.96315E-16 | 7.41533E-17 |
| $A_{18}$ | -1.10597E-16 | 2.06551E-16 |
| $A_{19}$ | 1.10281E-16 | -7.91928E-18 |
| $A_{20}$ | -7.55491E-18 | 1.57233E-18 |

FIG. 16B

| EXAMPLE 4 DATA RELATING TO ZOOMING | | | | | | | |
|---|---|---|---|---|---|---|---|
| | FOCAL LENGTH f | FNO. | ANGLE OF VIEW (2ω) | D5 | D10 | D15 | D21 |
| WIDE END | 15.13 | 1.53 | 24.6 | 0.50 | 12.95 | 2.95 | 10.00 |
| TELE END | 49.02 | 2.55 | 7.0 | 12.34 | 1.11 | 8.46 | 4.49 |

FIG. 17

| | EXAMPLE 5 BASIC LENS DATA | | | | |
|---|---|---|---|---|---|
| | Si SURFACE NUMBER | Ri CURVATURE RADIUS | Dj DISTANCE BETWEEN SURFACES | Ndj REFRACTIVE INDEX | νdj ABBE NUMBER |
| 10 { | 1 | 41.0733 | 3.42 | 1.72916 | 54.7 |
| | 2 | -88.6729 | 0.10 | | |
| | 3 | 17.3558 | 4.97 | 1.49700 | 81.6 |
| | 4 | -43.8010 | 1.69 | 1.62004 | 36.3 |
| | 5 | 18.1917 | D5 (VARIABLE) | | |
| 20 { | 6 | 18.9540 | 1.26 | 1.49700 | 81.6 |
| | 7 | 9.2945 | 1.87 | | |
| | 8 | -26.2846 | 0.70 | 1.83481 | 42.7 |
| | 9 | 6.9062 | 1.59 | 1.80518 | 25.4 |
| | 10 | 12.3043 | 0.89 | | |
| | 11 | 13.3245 | 1.70 | 1.80610 | 33.3 |
| | 12 | 83.6278 | D12 (VARIABLE) | | |
| | 13 (DIAPHRAGM) | — | 0.91 | | |
| 30 { | 14 | 11.9410 | 3.88 | 1.72916 | 54.7 |
| | 15 | -19.1844 | 0.15 | | |
| | 16 | -16.3096 | 0.70 | 1.67270 | 32.1 |
| | 17 | 16.3147 | D17 (VARIABLE) | | |
| 40 { | 18 | -17.3776 | 0.76 | 1.67270 | 32.1 |
| | 19 | 134.6458 | 0.49 | | |
| | 20 | 16.9259 | 3.46 | 1.49700 | 81.6 |
| | 21 | -99.0562 | 2.31 | | |
| | *22 | 12.6385 | 3.66 | 1.58913 | 61.2 |
| | *23 | -21.5872 | D23 (VARIABLE) | | |
| GC { | 24 | ∞ | 4.00 | 1.51680 | 64.2 |
| | 25 | ∞ | | | |

(* ASPHERIC)

FIG. 18A

| EXAMPLE 5 ASPHERIC SURFACE DATA | | |
|---|---|---|
| ASPHERIC SURFACE FACTOR | SURFACE NUMBER | |
| | 22ND SURFACE | 23RD SURFACE |
| K | 9.24826E-01 | 1.01135E+00 |
| $A_3$ | 5.50595E-04 | 7.98935E-04 |
| $A_4$ | -3.46992E-04 | -2.12967E-04 |
| $A_5$ | 3.99641E-06 | 2.11077E-05 |
| $A_6$ | 1.20780E-06 | 1.21065E-06 |
| $A_7$ | -1.31904E-08 | -1.92226E-07 |
| $A_8$ | -2.59278E-08 | -4.33587E-08 |
| $A_9$ | -4.20341E-09 | -4.27833E-09 |
| $A_{10}$ | -5.48504E-10 | -3.81553E-10 |
| $A_{11}$ | -4.32799E-11 | -2.06897E-11 |
| $A_{12}$ | -2.94183E-12 | -4.53202E-13 |
| $A_{13}$ | -6.35570E-14 | 6.78973E-14 |
| $A_{14}$ | 1.52019E-15 | 2.29405E-14 |
| $A_{15}$ | -4.08997E-15 | 4.43539E-15 |
| $A_{16}$ | -2.06463E-15 | 2.39798E-16 |
| $A_{17}$ | -5.93922E-16 | 7.30962E-17 |
| $A_{18}$ | -1.10335E-16 | 2.06435E-16 |
| $A_{19}$ | 1.10304E-16 | -7.92841E-18 |
| $A_{20}$ | -7.55248E-18 | 1.57179E-18 |

FIG. 18B

| EXAMPLE 5 DATA RELATING TO ZOOMING | | | | | | | |
|---|---|---|---|---|---|---|---|
| | FOCAL LENGTH f | FNO. | ANGLE OF VIEW ($2\omega$) | D5 | D12 | D17 | D23 |
| WIDE END | 15.14 | 1.53 | 23.4 | 0.57 | 12.91 | 2.97 | 10.00 |
| TELE END | 49.05 | 2.54 | 7.0 | 12.12 | 1.37 | 8.71 | 4.27 |

FIG. 19

| | EXAMPLE 6 BASIC LENS DATA | | | | |
|---|---|---|---|---|---|
| | Si<br>SURFACE NUMBER | Ri<br>CURVATURE RADIUS | Di<br>DISTANCE BETWEEN SURFACES | Ndj<br>REFRACTIVE INDEX | νdj<br>ABBE NUMBER |
| 10 | 1 | 32.6581 | 3.43 | 1.72916 | 54.7 |
| | 2 | -121.9337 | 0.10 | | |
| | 3 | 16.2821 | 5.04 | 1.49700 | 81.6 |
| | 4 | -47.5302 | 1.00 | 1.62004 | 36.3 |
| | 5 | 15.5903 | D5 (VARIABLE) | | |
| 20 | 6 | 17.3976 | 2.63 | 1.84666 | 23.8 |
| | 7 | 10.3893 | 2.17 | | |
| | 8 | -13.8492 | 0.70 | 1.83400 | 37.2 |
| | 9 | 8.4317 | 1.84 | 1.92286 | 18.9 |
| | 10 | 50.9958 | D10 (VARIABLE) | | |
| | 11 (DIAPHRAGM) | — | 0.80 | | |
| 30 | 12 | 16.9716 | 2.48 | 1.62041 | 60.3 |
| | 13 | -52.9059 | 0.10 | | |
| | 14 | 23.2463 | 2.50 | 1.72916 | 54.7 |
| | 15 | -39.5243 | 0.24 | | |
| | 16 | -24.3124 | 0.70 | 1.72825 | 28.5 |
| | 17 | 18.5670 | D17 (VARIABLE) | | |
| 40 | 18 | -18.2000 | 0.70 | 1.67270 | 32.1 |
| | 19 | 198.3021 | 0.79 | | |
| | 20 | 17.3513 | 2.50 | 1.49700 | 81.6 |
| | 21 | -103.3708 | 0.36 | | |
| | *22 | 13.4018 | 3.30 | 1.58913 | 61.2 |
| | *23 | -19.7537 | D23 (VARIABLE) | | |
| GC | 24 | ∞ | 4.00 | 1.51680 | 64.2 |
| | 25 | ∞ | | | |

( * ASPHERIC )

FIG. 20A

| EXAMPLE 6 ASPHERIC SURFACE DATA | | |
|---|---|---|
| ASPHERIC SURFACE FACTOR | SURFACE NUMBER | |
| | 22TH SURFACE | 23ST SURFACE |
| K | 9.30443E-01 | 1.01009E+00 |
| $A_3$ | 5.06591E-04 | 7.10930E-04 |
| $A_4$ | -3.22027E-04 | -1.81153E-04 |
| $A_5$ | 7.58629E-06 | 2.59352E-05 |
| $A_6$ | 1.80673E-06 | 1.69403E-06 |
| $A_7$ | 5.07550E-08 | -1.60446E-07 |
| $A_8$ | -1.90971E-08 | -4.08028E-08 |
| $A_9$ | -3.70767E-09 | -4.09476E-09 |
| $A_{10}$ | -5.11933E-10 | -3.63671E-10 |
| $A_{11}$ | -4.17554E-11 | -1.92428E-11 |
| $A_{12}$ | -2.95409E-12 | -3.14468E-13 |
| $A_{13}$ | -7.84676E-14 | 7.77079E-14 |
| $A_{14}$ | -1.34839E-15 | 2.36725E-14 |
| $A_{15}$ | -4.42782E-15 | 4.46652E-15 |
| $A_{16}$ | -2.10854E-15 | 2.39179E-16 |
| $A_{17}$ | -5.98437E-16 | 7.27197E-17 |
| $A_{18}$ | -1.10803E-16 | 2.06429E-16 |
| $A_{19}$ | 1.10268E-16 | -7.93862E-18 |
| $A_{20}$ | -7.55552E-18 | 1.56684E-18 |

FIG. 20B

| EXAMPLE 6 DATA RELATING TO ZOOMING | | | | | | | |
|---|---|---|---|---|---|---|---|
| | FOCAL LENGTH f | FNO. | ANGLE OF VIEW °($2\omega$) | D5 | D10 | D17 | D23 |
| WIDE END | 15.13 | 1.44 | 24.6 | 0.62 | 11.81 | 3.17 | 10.00 |
| TELE END | 49.03 | 2.53 | 7.2 | 11.28 | 1.15 | 7.66 | 5.51 |

FIG. 21

| | EXAMPLE 7 BASIC LENS DATA | | | | |
|---|---|---|---|---|---|
| | Si<br>SURFACE NUMBER | Ri<br>CURVATURE RADIUS | Di<br>DISTANCE BETWEEN SURFACES | Ndj<br>REFRACTIVE INDEX | νdj<br>ABBE NUMBER |
| 10 | 1 | 40.2958 | 3.28 | 1.72916 | 54.7 |
| | 2 | -86.1641 | 0.10 | | |
| | 3 | 16.7563 | 4.94 | 1.49700 | 81.6 |
| | 4 | -47.6810 | 1.00 | 1.62004 | 36.3 |
| | 5 | 17.3766 | D5 (VARIABLE) | | |
| 20 | 6 | 16.0253 | 2.25 | 1.80518 | 25.4 |
| | 7 | 10.2514 | 2.25 | | |
| | 8 | -13.0911 | 0.70 | 1.80610 | 33.3 |
| | 9 | 7.9329 | 1.94 | 1.92286 | 18.9 |
| | 10 | 60.3402 | D10 (VARIABLE) | | |
| | 11(DIAPHRAGM) | — | 0.80 | | |
| 30 | 12 | 13.6860 | 2.78 | 1.72916 | 54.7 |
| | 13 | -29.8844 | 0.42 | | |
| | 14 | -32.4411 | 0.80 | 1.80518 | 25.4 |
| | 15 | 38.0409 | 0.80 | | |
| | 16 | -37.8422 | 1.03 | 1.62004 | 36.3 |
| | 17 | -108.9502 | D17 (VARIABLE) | | |
| 40 | 18 | -17.8941 | 0.70 | 1.67270 | 32.1 |
| | 19 | 175.5921 | 0.28 | | |
| | 20 | 16.6715 | 2.57 | 1.49700 | 81.6 |
| | 21 | -87.2281 | 0.10 | | |
| | *22 | 12.4993 | 3.55 | 1.58913 | 61.2 |
| | *23 | -21.9240 | D23 (VARIABLE) | | |
| GC | 24 | ∞ | 4.00 | 1.51680 | 64.2 |
| | 25 | ∞ | | | |

(* ASPHERIC)

FIG. 22A

| ASPHERIC SURFACE FACTOR | EXAMPLE 7 ASPHERIC SURFACE DATA | |
|---|---|---|
| | SURFACE NUMBER | |
| | 22ND SURFACE | 23RD SURFACE |
| K | 9.21032E-01 | 1.01060E+00 |
| $A_3$ | 4.82601E-04 | 6.87402E-04 |
| $A_4$ | -3.80787E-04 | -1.89624E-04 |
| $A_5$ | 4.52023E-06 | 2.30802E-05 |
| $A_6$ | 1.58772E-06 | 1.32724E-06 |
| $A_7$ | 2.60042E-08 | -1.85673E-07 |
| $A_8$ | -2.30027E-08 | -4.26037E-08 |
| $A_9$ | -4.15176E-09 | -4.20614E-09 |
| $A_{10}$ | -5.67731E-10 | -3.75469E-10 |
| $A_{11}$ | -4.70025E-11 | -2.05876E-11 |
| $A_{12}$ | -3.53028E-12 | -5.15586E-13 |
| $A_{13}$ | -1.27745E-13 | 5.43885E-14 |
| $A_{14}$ | -6.39956E-15 | 2.05261E-14 |
| $A_{15}$ | -4.83982E-15 | 4.14103E-15 |
| $A_{16}$ | -2.14879E-15 | 1.99624E-16 |
| $A_{17}$ | -6.01290E-16 | 6.89868E-17 |
| $A_{18}$ | -1.11126E-16 | 2.05942E-16 |
| $A_{19}$ | 1.10233E-16 | -7.97537E-18 |
| $A_{20}$ | -7.56204E-18 | 1.56570E-18 |

FIG. 22B

| EXAMPLE 7 DATA RELATING TO ZOOMING | | | | | | | |
|---|---|---|---|---|---|---|---|
| | FOCAL LENGTH f | FNO. | ANGLE OF VIEW (2ω) | D5 | D10 | D17 | D23 |
| WIDE END | 15.13 | 1.54 | 24.8 | 0.50 | 13.03 | 1.97 | 10.00 |
| TELE END | 49.02 | 2.55 | 7.0 | 12.40 | 1.13 | 7.52 | 4.45 |

FIG. 23

| | EXAMPLE 8 BASIC LENS DATA | | | |
|---|---|---|---|---|
| Si<br>SURFACE NUMBER | Ri<br>CURVATURE RADIUS | Di<br>DISTANCE BETWEEN SURFACES | Ndj<br>REFRACTIVE INDEX | $\nu$dj<br>ABBE NUMBER |
| 1 | 44.6854 | 3.21 | 1.72916 | 54.7 |
| 2 | -77.7933 | 0.10 | | |
| 3 | 17.2035 | 4.88 | 1.49700 | 81.6 |
| 4 | -46.3461 | 1.00 | 1.62004 | 36.3 |
| 5 | 18.6067 | D5 (VARIABLE) | | |
| 6 | 16.1169 | 2.31 | 1.67003 | 47.3 |
| 7 | 10.2097 | 2.20 | | |
| 8 | -13.7034 | 0.70 | 1.80610 | 33.3 |
| 9 | 7.6671 | 1.95 | 1.92286 | 20.9 |
| 10 | 50.5047 | D10 (VARIABLE) | | |
| 11 (DIAPHRAGM) | — | 0.80 | | |
| 12 | 13.2129 | 3.71 | 1.72916 | 54.7 |
| 13 | -18.2025 | 0.70 | 1.67270 | 32.1 |
| 14 | 19.3953 | D14 (VARIABLE) | | |
| 15 | -16.4237 | 0.70 | 1.67270 | 32.1 |
| 16 | 181.5645 | 0.46 | | |
| 17 | 16.3693 | 2.58 | 1.49700 | 81.6 |
| 18 | -95.3341 | 0.20 | | |
| *19 | 12.3221 | 3.92 | 1.58913 | 61.2 |
| *20 | -22.2785 | D20 (VARIABLE) | | |
| 21 | ∞ | 4.00 | 1.51680 | 64.2 |
| 22 | ∞ | | | |

(*: ASPHERIC)

FIG. 24A

| EXAMPLE 8 ASPHERIC SURFACE DATA | | |
|---|---|---|
| ASPHERIC SURFACE FACTOR | SURFACE NUMBER | |
| | 20TH SURFACE | 21ST SURFACE |
| $K$ | 9.21091E-01 | 1.01033E+00 |
| $A_3$ | 3.75017E-04 | 5.27315E-04 |
| $A_4$ | -3.72730E-04 | -1.75037E-04 |
| $A_5$ | 3.96093E-06 | 2.26260E-05 |
| $A_6$ | 1.34915E-06 | 9.75404E-07 |
| $A_7$ | -5.75080E-09 | -2.28272E-07 |
| $A_8$ | -2.67141E-08 | -4.68950E-08 |
| $A_9$ | -4.44883E-09 | -4.46379E-09 |
| $A_{10}$ | -5.95672E-10 | -3.85130E-10 |
| $A_{11}$ | -4.92674E-11 | -1.96323E-11 |
| $A_{12}$ | -3.78908E-12 | -2.15612E-13 |
| $A_{13}$ | -1.54566E-13 | 9.68263E-14 |
| $A_{14}$ | -1.00025E-14 | 2.66421E-14 |
| $A_{15}$ | -5.22854E-15 | 4.78854E-15 |
| $A_{16}$ | -2.19921E-15 | 2.79455E-16 |
| $A_{17}$ | -6.06470E-16 | 7.65425E-17 |
| $A_{18}$ | -1.11824E-16 | 2.06798E-16 |
| $A_{19}$ | 1.10169E-16 | -7.89158E-18 |
| $A_{20}$ | -7.56648E-18 | 1.57894E-18 |

FIG. 24B

| EXAMPLE 8 DATA RELATING TO ZOOMING | | | | | | | |
|---|---|---|---|---|---|---|---|
| | FOCAL LENGTH $f$ | FNO. | ANGLE OF VIEW $(2\omega)$ | D5 | D10 | D14 | D20 |
| WIDE END | 15.13 | 1.53 | 24.8 | 0.50 | 13.26 | 2.88 | 10.00 |
| TELE END | 49.03 | 2.55 | 7.2 | 12.61 | 1.15 | 8.64 | 4.24 |

FIG. 25

| | VALUE OF CONDITIONAL EXPRESSION | | | |
|---|---|---|---|---|
| | EXPRESSIONS (1), (2) | | EXPRESSIONS (3) | EXPRESSIONS (4) |
| | $\nu$d(L11) | $\nu$d(L12) | N23 | $\nu$d(L42) |
| EXAMPLE 1 | 54.7 | 81.6 | 1.92 | 81.6 |
| EXAMPLE 2 | 60.3 | 81.6 | 1.92 | 81.6 |
| EXAMPLE 3 | 54.7 | 81.6 | 1.92 | 81.6 |
| EXAMPLE 4 | 53.9 | 64.1 | 1.92 | 64.1 |
| EXAMPLE 5 | 54.7 | 81.6 | 1.81 | 81.6 |
| EXAMPLE 6 | 54.7 | 81.6 | 1.92 | 81.6 |
| EXAMPLE 7 | 54.7 | 81.6 | 1.92 | 81.6 |
| EXAMPLE 8 | 54.7 | 81.6 | 1.92 | 81.6 |

EXAMPLE 1 (WIDE END)
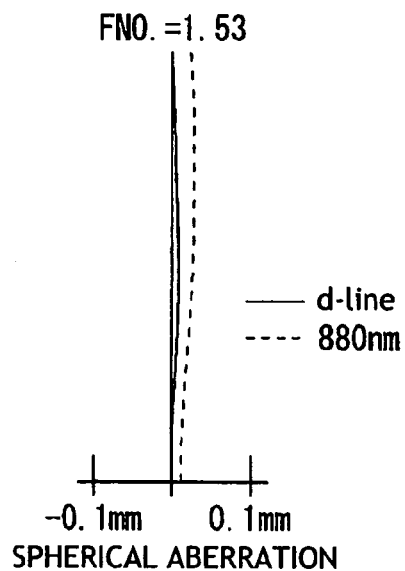
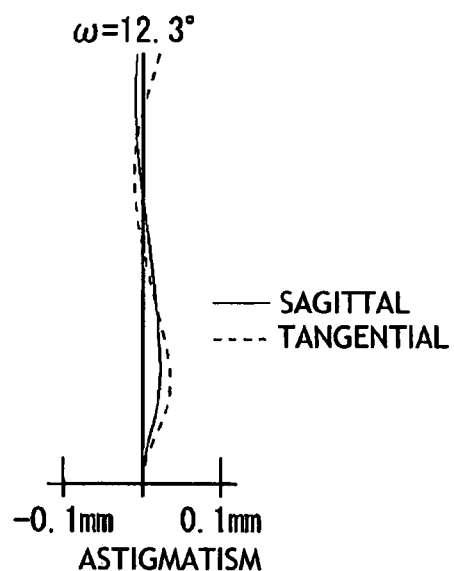
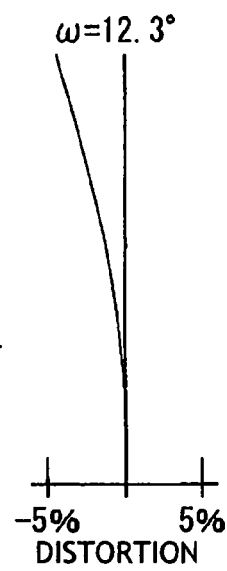
FIG. 26A     FIG. 26B     FIG. 26C
EXAMPLE 1 (TELEPHOTO END)
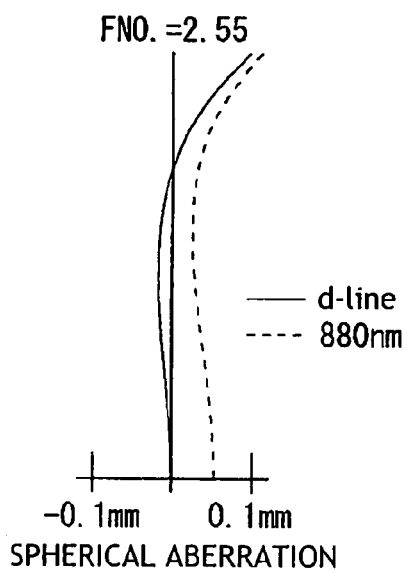
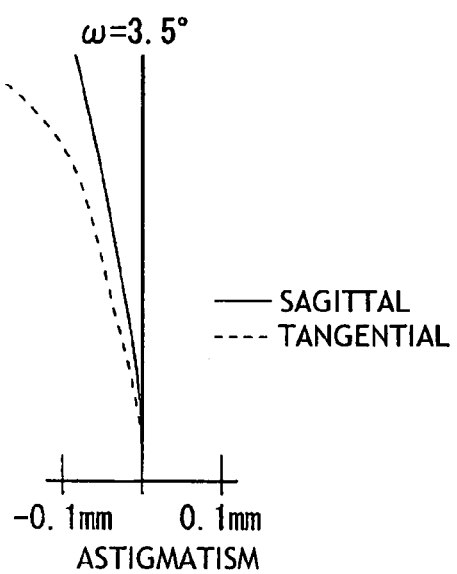
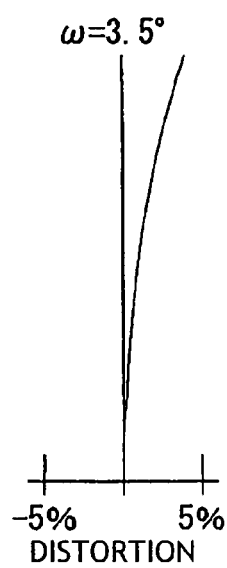
FIG. 27A     FIG. 27B     FIG. 27C

EXAMPLE 2 (WIDE END)

EXAMPLE 2 (TELEPHOTO END)

EXAMPLE 3 (WIDE END)

EXAMPLE 3 (TELEPHOTO END)

EXAMPLE 4 (WIDE END - VISIBLE REGION)

EXAMPLE 4 (TELEPHOTO END - VISIBLE REGION)

EXAMPLE 4 (WIDE END)

EXAMPLE 4 (TELEPHOTO END)

EXAMPLE 5 (WIDE END)

EXAMPLE 5 (TELEPHOTO END)

EXAMPLE 6 (WIDE END)

EXAMPLE 6 (TELEPHOTO END)

EXAMPLE 7 (WIDE END)

EXAMPLE 7 (TELEPHOTO END)

EXAMPLE 8 (WIDE END)

EXAMPLE 8 (TELEPHOTO END)

ZOOM LENS

BACKGROUND OF THE INVENTION

1. Technical Field

The invention relates to a zoom lens having a zoom ratio of about 3.3 for use in a video camera, an electronic still camera or the like, and more particularly to a small-sized zoom lens that is used on a relatively telephoto side and suited for a dome monitoring camera or the like.

2. Related Art

There is known, as a zoom lens for use in a vide camera or a digital still camera, a zoom lens having a four group system in which the power of the zoom lens varies by moving a second group along the optical axis with first and third groups fixed and a position of an image plane is corrected by moving a fourth group. For example, JP 2006-3589 A (corresponding to US 2005/280901 A) and Japanese Patent No. 3391342 (corresponding to U.S. Pat. No. 6,404,561) have proposed the following zoom lens. An optical system includes a first group having a positive refractive power, a second group having a negative refractive power, a third group having a positive refractive power and a fourth group following the third group. The first group is formed of, in order from the object side, three lenses, that is, a negative lens having a convex surface directed to the object side, a positive lens having a convex surface directed to the object side and a positive lens having a convex surface directed to the object side, to thereby ensure high magnification ratio from a wide end to a telephoto end.

Recently, as to the optical system for the monitoring camera, demand for a telephoto side is rising due to its installation site. Also, because of spread of a small dome camera, demand for miniaturization of the optical system also becomes severe. Under such a circumstance, the zoom lenses disclosed in JP 2006-3589 A (corresponding to US 2005/280901 A) and Japanese Patent No. 3391342 (corresponding to U.S. Pat. No. 6,404,561) can be reduced in the total length of the lens by reducing the zoom ratio. However, it is difficult that such an optical system required for telephoto use is reduced in size so as to be received in the dome camera even if the zoom ratio is made small. Consequently, there is a desire for a small-sized zoom lens suited particularly for a dome monitoring camera or the like.

SUMMARY OF THE INVENTION

In view of the above, the invention provides a zoom lens small in size but high in performance that allows power variation on a relatively telephoto side.

According to an aspect of the invention, a zoom lens includes, in order from an object side, a first group having a positive refractive power, a second group having a negative refractive power, a diaphragm, a third group having a positive refractive and a fourth group following the third group. When a power of the zoom lens varies from a wide-angle end to a telephoto end, the second group is moved along an optical axis toward an image side with the first and third groups fixed to the optical axis and the fourth group is moved along the optical axis to perform correction of a position of the image plane, which is associated with the variation of the power, and focusing. The first group includes, in order from the object side, a first lens of the first group having a positive refractive power, a second lens of the first group having a positive refractive power and a third lens of the first group having a negative refractive power.

In the zoom lens of this configuration, the power of the zoom lens varies by moving the second group along the optical axis with the first and third groups fixed. The fourth group is moved along the optical axis to perform correction of the position of the image plane and focusing, which is required due to the variation of the power. Particularly, since the first group is configured so that positive, positive and negative lenses are arranged in order from the object side, power arrangement in the first group is optimized, which is advantageous in reducing the size.

Also, the zoom lens may be configured as follows in response to the required specification and in view of size reduction, performance improvement, cost reduction and so on.

A combined refractive power of the second and third lenses of the first group may be negative. This configuration is advantageous in reducing the length of the lens. Also, the second and third lenses of the first group may form a cemented lens. This configuration can avoid the performance deterioration caused by assembling error. Also, in order to obtain a good optical performance in the visible region, at least one lens of the first group satisfies the following conditional expression (1). Furthermore, in order to achieve a good optical performance over from the visible region to near-infrared region, the following conditional expression (2) may be satisfied. It is noted that νd denotes an Abbe number at d-line having 587.6 nm in wavelength.

$$\nu d > 50 \qquad (1)$$

$$\nu d > 75 \qquad (2)$$

The second group may include, in order from the object side, a first lens of the second group having a negative refractive power, a second lens of the second group having a biconcave shape and a third lens of the second group having a positive refractive power. By providing the cemented lens, performance deterioration due to assembling error can be avoided. Also, the second group may further include a lens having a positive or negative refractive power on the object side of the first lens of the second group or on the image side of the third lens of the second group. This configuration is advantageous in reducing the aberration variation due to power variation. Furthermore, the third lens of the second group satisfies the following conditional expression (3). This configuration suppresses the movement amount of the second group, which is advantageous in reducing the size. It is noted that N23 denotes a refractive index of the third lens of the second group at d-line having 587.6 nm in wavelength.

$$N23 > 1.75 \qquad (3)$$

The third group may include at least one lens having a positive refractive power and at least one lens having a negative refractive power. This configuration is advantageous in correcting the longitudinal chromatic aberration caused in the third group, thus making it possible to increase the aperture ratio. In this case, the third group may include, in order from the object side, a first single lens of the third group having a positive refractive power and a second single lens of the third group having a negative refractive power with a concave surface directed to the object side. This configuration is advantageous in size reduction and cost reduction. Alternatively, the third group may include a cemented lens formed of a first lens of the third group having a positive refractive power and a second lens of the third group having a negative refractive power with the first and second lenses of the third group arranged in order from the object side. This configuration is advantageous in the capability to avoid the performance deterioration due to assembling error. Also, the least one lens of the third group having the positive refractive power may have at least one aspheric surface. This configuration can increase the aperture ratio while maintaining the size reduction.

The fourth group may have a positive refractive power. Also, the fourth group may include, in order from the object side, a first lens of the fourth group having a negative refractive power with a concave surface directed to the object side, a second lens of the fourth group having a positive refractive power and a third lens of the fourth group having a positive refractive power. At least one surface of the lenses of the fourth group having the positive refractive power may be aspheric. This configuration is advantageous in correcting aberrations and can increase the aperture ratio. In this case, at least one surface of the third lens of the fourth group may be aspheric. Also, at least one lens of the fourth group satisfies the following conditional expression (4). This configuration can prevent the longitudinal chromatic aberration from increasing over the entire power variation range of from the wide-angle end to the telephoto end.

$$vd>75 \qquad (4)$$

According to the zoom lens set fort above, in a four-group system zoom lens in which the first and third groups are fixed, When the power of the zoom lens varies, the second group is moved along the optical axis, and the fourth group is moved along the optical axis to perform correction of a position of the image plane, which is associated with the variation of the power, power arrangement is properly made in the first group. Therefore, a small-sized high performance zoom lens is realized that is adapted for power variation on the relatively telephoto side and suited for use on a dome monitoring camera or the like because power arrangement is properly made over the first group, in a 4-group-schemed zoom lens that magnification change is made by moving the second group on the optical axis with the first and third groups fixed wherein correction at the image surface based thereon is made by means of the fourth group.

BRIEF DESCRIPTION OF THE DRAWING

FIG. 1 is shows a first configuration example of a zoom lens according to an embodiment of the invention and is a lens sectional view corresponding to an example 1.

FIG. 2 is shows a second configuration example of a zoom lens according to the embodiment of the invention and is a lens sectional view corresponding to an example 2.

FIG. 9 shows the basic lens data of the zoom lens according to the example 1.

FIG. 10 shows other lens data of the zoom lens according to the example 1, wherein (A) shows data relating to aspheric surfaces and (B) shows data relating to zooming.

FIG. 11 shows the basic lens data of the zoom lens according to the example 2.

FIG. 12 shows other lens data of the zoom lens according to the example 2, wherein (A) shows data relating to aspheric surfaces and (B) shows data relating to zooming.

FIG. 13 shows the basic lens data of the zoom lens according to the example 3.

FIG. 14 shows other lens data of the zoom lens according to example 3, wherein (A) shows data relating to aspheric surfaces and (B) shows data relating to zooming.

FIG. 15 shows the basic lens data of the zoom lens according to the example 4.

FIG. 16 shows other lens data of the zoom lens according to the example 4, wherein (A) shows data relating to aspheric surfaces and (B) shows data relating to zooming.

FIG. 17 shows the basic lens data of the zoom lens according to the example 5.

FIG. 18 shows other lens data of the zoom lens according to the example 5, wherein (A) shows data relating to aspheric surfaces and (B) shows data relating to zooming.

FIG. 19 shows the basic lens data of the zoom lens according to the example 6.

FIG. 20 shows other lens data of the zoom lens according to example 6, wherein (A) shows data relating to aspheric surfaces and (B) shows data relating to zooming.

FIG. 21 shows the basic lens data of the zoom lens according to the example 7.

FIG. 22 shows other lens data of the zoom lens according to the example 7, wherein (A) shows data relating to aspheric surfaces and (B) shows data relating to zooming.

FIG. 23 shows the basic lens data of the zoom lens according to the example 8.

FIG. 24 shows other lens data of the zoom lens according to the example 8, wherein (A) shows data relating to aspheric surfaces and (B) shows data relating to zooming.

FIG. 25 shows values related to conditional expressions collectively on an example-by-example basis.

FIG. 26 is an aberration diagram showing various aberrations at the wide-angle end of the zoom lens according the example 1, wherein (A) shows spherical aberration, (B) shows astigmatism and (C) shows distortion.

FIG. 27 is an aberration diagram showing various aberrations at the telephoto end of the zoom lens according the example 1, wherein (A) shows spherical aberration, (B) shows astigmatism and (C) shows distortion.

DETAILED DESCRIPTION OF EMBODIMENTS OF THE INVENTION

With reference to the drawings, exemplary embodiments of the invention will be described in detail.

Figure 3:
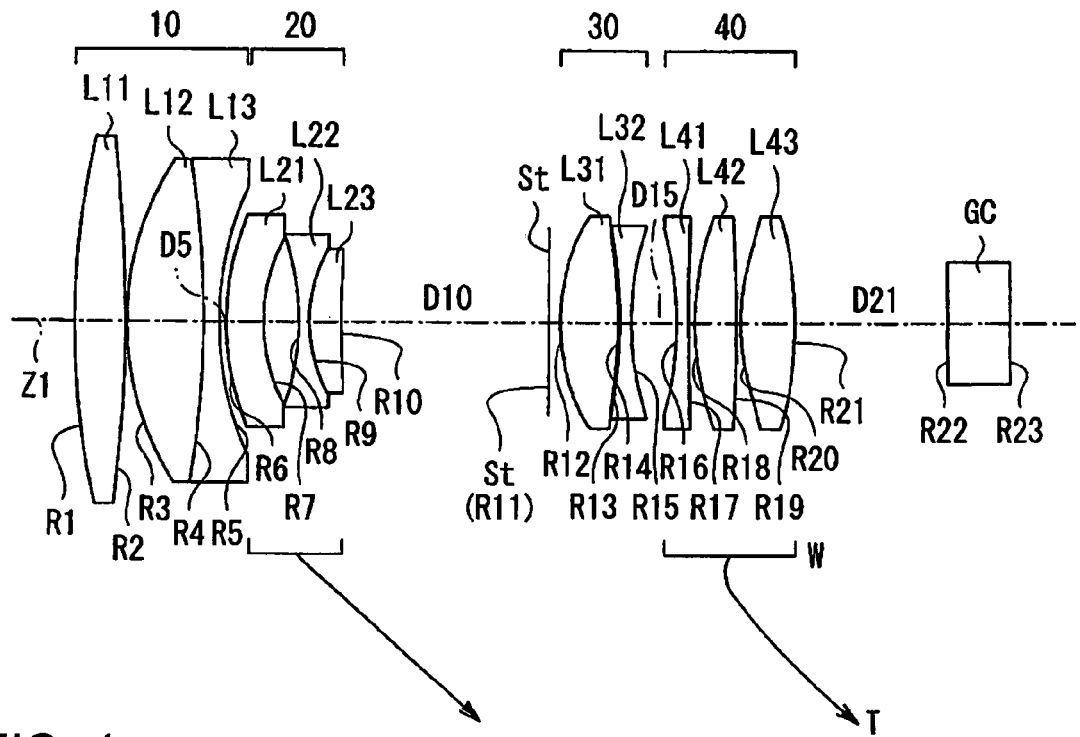
FIG. 3 is shows a third configuration example of a zoom lens according to the embodiment of the invention and is a lens sectional view corresponding to an example 3.
Figure 4:
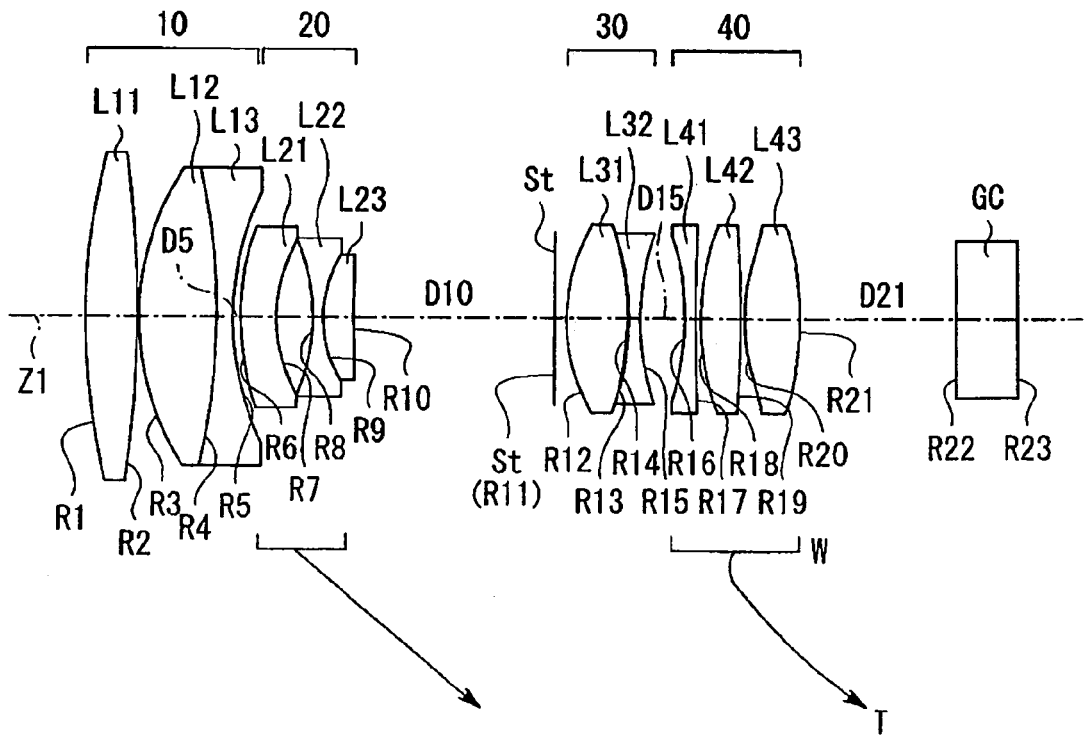
FIG. 4 is shows a fourth configuration example of a zoom lens according to the embodiment of the invention and is a lens sectional view corresponding to an example 4.
Figure 5:
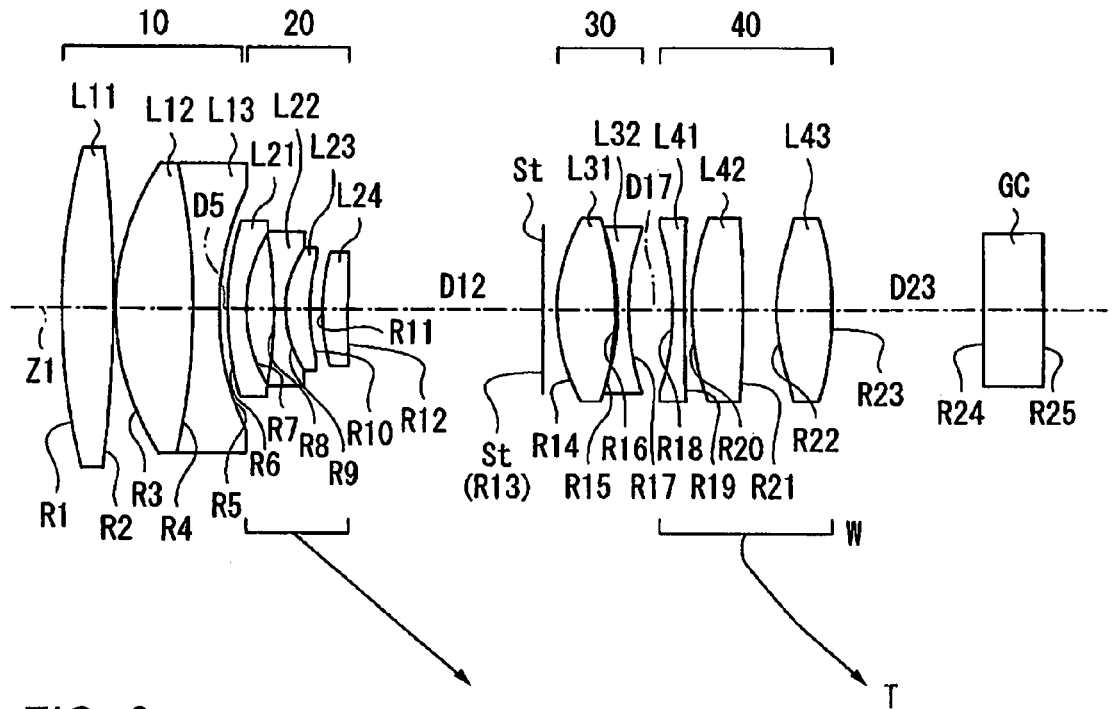
FIG. 5 is shows a fifth configuration example of a zoom lens according to the embodiment of the invention and is a lens sectional view corresponding to an example 5.
Figure 6:
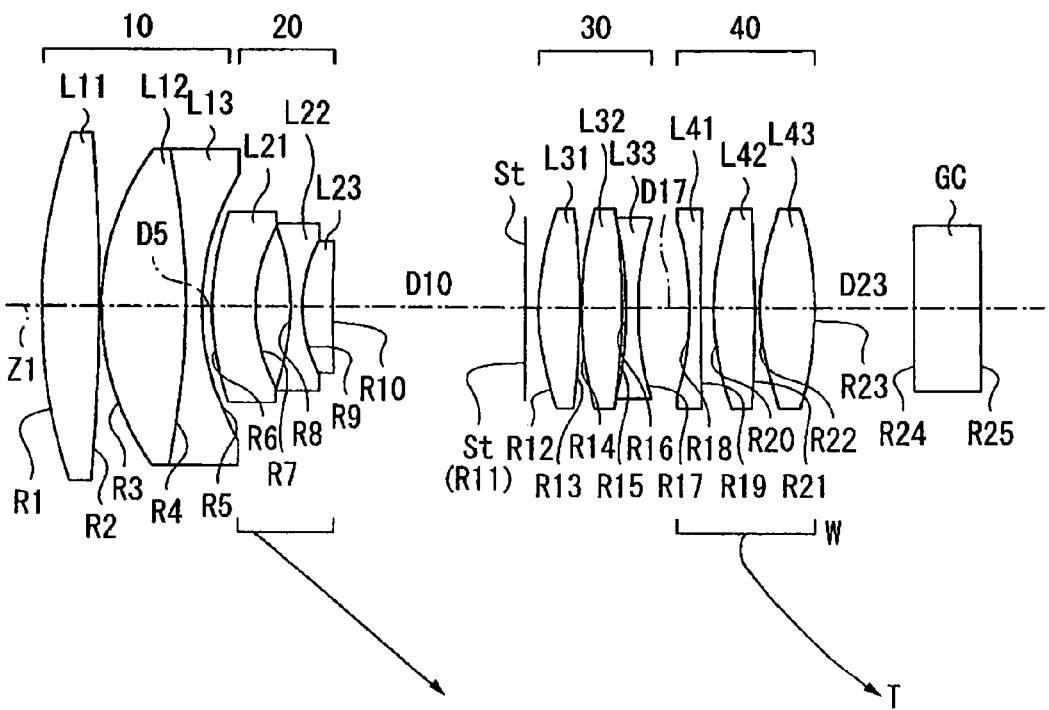
FIG. 6 is shows a sixth configuration example of a zoom lens according to the embodiment of the invention and is a lens sectional view corresponding to an example 6.
Figure 7:
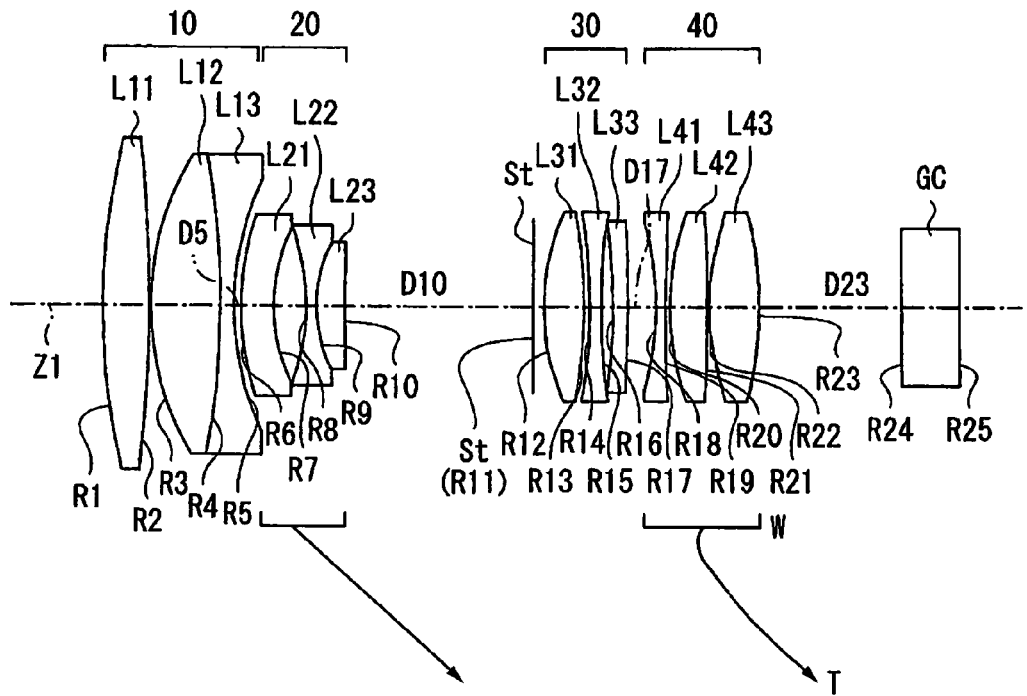
FIG. 7 is shows a seventh configuration example of a zoom lens according to the embodiment of the invention and is a lens sectional view corresponding to an example 7.
Figure 8:
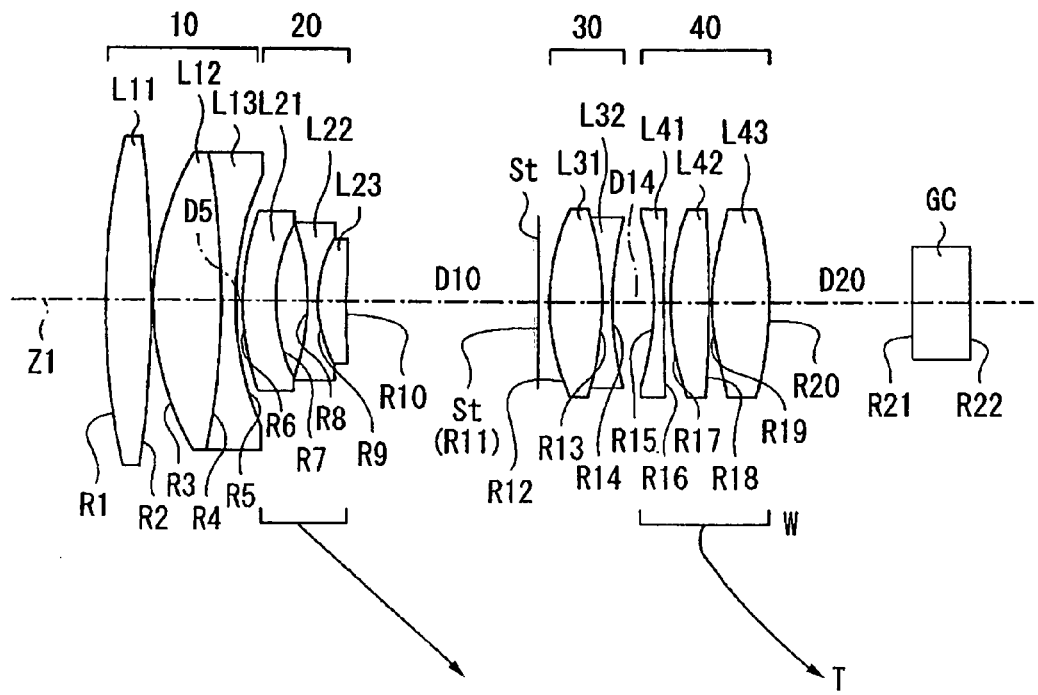
FIG. 8 is shows an eighth configuration example of a zoom lens according to the embodiment of the invention and is a lens sectional view corresponding to an example 8.

FIG. 1 shows a first configuration example of a zoom lens according to an embodiment of the invention. This configuration example corresponds to a lens configuration of numerical example 1 (FIGS. 9, 10(A) and 10(B)), which will be described later. FIG. 2 shows a second configuration example corresponding to a lens configuration of numerical example 2 (FIGS. 11, 12(A) and 12(B)), which will be described later. FIG. 3 shows a third configuration example corresponding to a lens configuration of numerical example 3 (FIGS. 13, 14(A) and 14(B)), which will be described later. FIG. 4 shows a fourth configuration example corresponding to a lens configuration of numerical example 4 (FIGS. 17, 18(A) and 18(B)), which will be described later. FIG. 5 shows a fifth configuration example corresponding to a lens configuration of numerical example 5 (FIGS. 17, 18(A) and 18(B)), which will be described later. FIG. 6 shows a sixth configuration example corresponding to a lens configuration of numerical example 6 (FIGS. 19, 20(A) and 20(B)), which will be described later. FIG. 7 shows a seventh configuration example corresponding to a lens configuration of numerical example 7 (FIGS. 21, 22(A) and 22(B)), which will be described later. FIG. 8 shows an eighth configuration example corresponding to a lens configuration of numerical example 8 (FIGS. 23, 24(A) and 24(B)), which will be described later.

In FIGS. 1 to 8, reference symbol Ri represents a curvature radius (mm) of the i-th surface counted increasing sequentially as going toward the image side (image formation side) wherein the surface of the constituent element closest to the object side is taken as a first. Reference symbol Di represents a distance on an optical axis Z1 between the i-th surface and the (i+1)-th surface. The reference symbol Di is only given to portions where Di changes along with power variation.

The zoom lens is used for a video camera, an electronic still camera or the like, and suitably used particularly for a small-sized dome monitoring camera or the like. The zoom lens has a first group 10 having a positive refractive power, a second group 20 having a negative refractive power, a diaphragm St, a third group 30 having a positive refractive power, and a fourth group 40 following the third group 30, in order from the object side along an optical axis Z1. An imaging device such as a CCD (charge coupled device) or a CMOS (complementary metal oxide semiconductor), not shown, is arranged on an image formation surface. A plate-like optical member GC, e.g. an image-surface protecting cover glass or an infrared blocking filter is arranged between the fourth group 40 and the imaging device, in response to the camera structure to which the lens is fitted.

In the above configuration, when the power of the zoom lens varies from the wide-angle end to the telephoto end, the second group 20 is moved along an optical axis Z1 toward an image side with the first and third groups 10, 30 fixed so as to vary the power and the fourth group 40 is moved along the optical axis Z1 to perform correction of a position of the image plane and focusing, which is required due to the variation of the power. At this time, the second and fourth groups 20, 40 are moved so as to draw loci shown with solid lines in FIGS. 1 to 8. It is noted that, in FIGS. 1 to 8, 'W' represents a lens position at the wide-angle end while 'T' represents that at the telephoto end.

The first group 10 has a first lens L11 having a positive refractive power, a second lens L12 having a positive refractive power and a third lens L13 having a negative refractive power, in order from the object side. The second and third lenses L12, L13 may form a cemented lens or be respectively single lenses. Incidentally, in the first to eighth configuration examples, the first and second lenses L11, L12 have a biconvex shape while the third lens L13 has a biconcave shape. In the second configuration example, each of the second and third lenses L12, L13 is formed of a single lens. In the configuration examples other than the second configuration example, the second lens L12 and the third lens constitute L13 form a cemented lens.

Also, at least one lens of the first group 10 preferably satisfies the following conditional expression, where vd denotes Abbe number at d-line having 587.6 nm in wavelength.

$$vd > 50 \qquad (1)$$

Furthermore, at least one surface of the first group 10 preferably satisfies the following conditional expression.

$$vd>75 \quad (2)$$

The second group 20 preferably has a first lens L21 having a negative refractive power and a cemented lens formed of a second lens L22 having in a biconcave shape and a third lens L23 having a positive refractive power, in order from the object side. A positive or negative lens may be added on the object side of the first lens L21 or on the image side of the third lens L23. In the fifth configuration example, the second group is formed into a three-group four-lens configuration in which a fourth lens L24 having a positive refractive power is added on the image side of the third lens L23. In the configuration examples other than the fifth configuration example, the second group is formed into a two-group three-lens configuration having the first lens L21 and the cemented lens formed of the second and third lenses L22, L23. Also, in the first to eighth configuration examples, the first lens L21 is formed of a negative meniscus lens having a convex surface directed to the object side while the third lens L23 is formed of a positive meniscus lens having a convex surface directed to the object side.

Also, the third lens L23 preferably satisfies the following conditional expression, wherein N23 denotes a refractive index of the third lens L23 at d-line.

$$N23>1.75 \quad (3)$$

The third group 30 preferably has at least one lens having a positive refractive power and at least one lens having a negative refractive power. For example, the third group 30 may have a first lens L31 having a positive refractive power and a second lens L32 having a negative refractive power with a concave surface directed to the object side, in order from the object side. At this time, the first lens L31 and the second lens L32 may be each made of a single lens or those may form a cemented lens. Also, in the third group 30, at least one surface of the lenses having the positive refractive power is preferably aspheric.

Incidentally, the third group 30 of the sixth configuration example is formed into a three-lens configuration having a first lens L31 having a biconvex shape, a second lens L32 having a biconvex form and a third lens L33 having a biconcave shape, in order from the object side. The third group 30 of the seventh configuration example is formed into a three-lens configuration having a first lens L31 having a biconvex shape, a second lens L32 having a biconcave shape and a third lens L33 having a negative refractive power with a concave surface directed to the object side in order from the object side. The third group 30 of the eighth configuration example has a cemented lens formed of a first lens L31 having a biconvex shape and a second lens L32 having a biconcave shape in order from the object side. The third group 30 of the configuration examples other than the sixth to eighth configuration examples has two single lenses, that is, a first lens L31 having a biconvex shape and a second lens L32 having a biconcave shape in order from the object side.

The fourth group 40 preferably has a positive refractive power. Also, the fourth group 40 preferably has a first lens L41 having a negative refractive power with a concave surface directed the object side, a second lens L42 having a positive refractive power and a third lens L43 having a positive refractive power in order from the object side wherein at least one surface of the lenses having the positive refractive power is preferably aspheric. Particularly, at least one surface of the third lens L43 is preferably aspheric. Incidentally, in the first to eighth configuration examples, the first lens L41 is a negative meniscus lens having concave surface directed to the object side while the second lens L42 and the third lens L43 are biconvex lenses.

At least one lens of the fourth group 40 preferably satisfies the following conditional expression.

$$vd>75 \quad (4)$$

Now the function and effect of the zoom lens configured as the above will be described.

Figure 44:
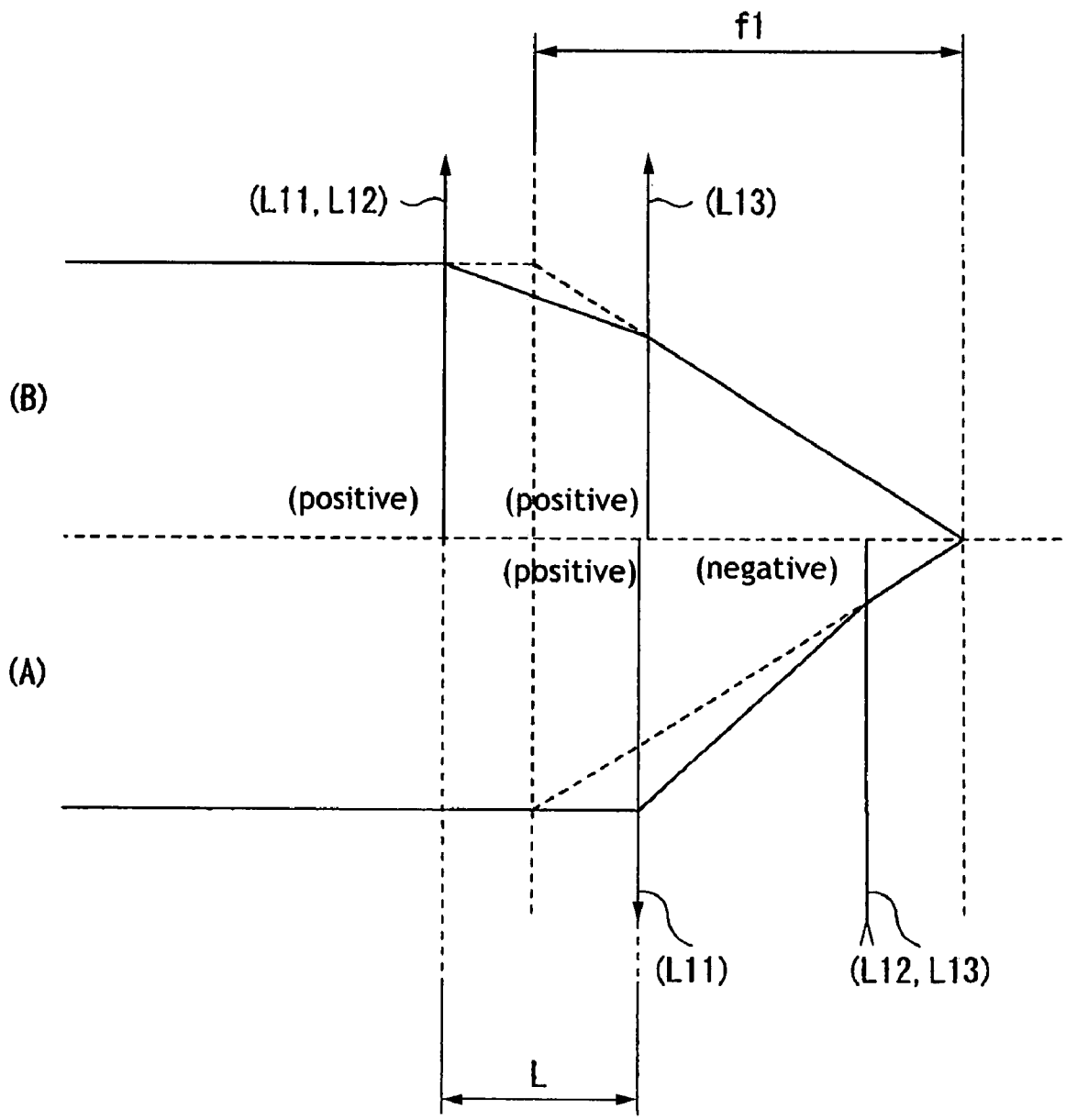
FIG. 44 is a schematic drawings showing a combined focal length of a first group and lens length of a zoom lens system, wherein (A) is based on the embodiment of the invention while (B) is based on the related art.

In this zoom lens, the power of the zoom lens varies by moving the second group 20 along the optical axis with the first and third groups 10, 30 fixed, and the fourth group 40 corrects a position of the resultant image surface. Particularly, since positive, positive and negative lenses are arranged in order from the object side in the first group 10, to thereby optimize the power arrangement in the first group 10 and achieve reduction in lens length. This can be explained by considering the two image-side lenses (the second and third lenses L12, L13) of the first group 10 as a single negative lens obtained by combining those lenses. By considering so, the first group 10 can be regarded as a structure having one positive lens and one negative lens in order from the object side. FIG. 44(A) schematically shows a relation between a combined focal length fl of the first group 10 and a lens length in that case. Also, FIG. 44(B) schematically shows that the first group is regarded as a structure having two positive lenses by combining object-side two lenses together in the lens configuration (negative, positive, and positive) of the first group of the related art zoom lens (e.g., JP 2006-3589 A (corresponding to US 2005/280901 A) and Japanese Patent No. 3391342 (corresponding to U.S. Pat. No. 6,404,561)). As shown in FIGS. 44(A) and 44(B), it can be seen that, provided that the combined focal length f1 is equal, the lens length of the zoom lens according to the embodiment can be shortened by a length L as compared to that of the related-art zoom lens. Also, if the two image-side lenses of the first group 10, that is, the second and third lenses L12, L13 form a cemented lens, deterioration in its property due to assembling error can be avoided.

Also, in this zoom lens, deterioration in its property due to assembling error can be avoided by using a cemented lens formed of the second and third lenses L22, L23 of the second group 20. Furthermore, if a lens having a positive or negative refractive power is added on the image side of the third lens L23 of the second group 20 or on the object side of the first lens L21 of the second group 20, this configuration is advantageous in suppressing various aberrations occurring in the second group 20 while variation in aberrations due to the power variation can be reduced.

Also, in this zoom lens, the third group 30 includes at least one positive lens and at least one negative lens. Thereby, the longitudinal chromatic aberration occurring in the third group is corrected. Also, when the third group 30 has two or more lenses, aperture ratio can be made greater.

Particularly, when the third group 30 includes two single lenses, that is, the first lens L31 having a positive refractive power and a second lens L32 having a negative power with a concave surface directed to the object side in order from the object side, this configuration is advantageous in size and cost reductions while the longitudinal chromatic aberration occurring in the third group 30 is corrected. Also, at this time, when at least one surface of the first lens L31 of the third group 30 is made aspheric, aperture ratio can be made greater while achieving size reduction.

Alternatively, the third group 30 may include a cemented lens formed of a first lens L31 having a positive refractive power and a second lens L32 having a negative refractive power in order from the object side. Thereby, deterioration in its property due to assembling error can be avoided.

Also, in this zoom lens, the fourth group 40 has, on the most object side, a first lens L41 having a negative refractive power with a concave surface directed to the object side. Thereby, incident rays of light upon the fourth group 40 are raised up. This configuration can suppress the luminance flux exiting from the third group 30 smaller in diameter, thus reducing the aberration amount of the luminous flux entering the fourth group 40. Also, by arranging a second lens L42 having a positive refractive power in rear of the first lens L41 (in a position closer to the image side), the longitudinal chromatic aberration occurring in the fourth group 40 can be corrected. Furthermore, when at least one surface of the lenses having the positive refractive power is made aspheric and the luminous flux is converged by this positive lens having the aspheric surface, aperture ratio can be increased while maintaining the optical performance high. Accordingly, it is effective to make at least one surface of a lens that is arranged closer to the image side and that has a positive refractive power aspheric.

The conditional expressions (1), (2), (4) are related to Abbe number at d-line. When the first group 10 satisfies the conditional expression (1), the zoom lens is advantageous in correcting aberrations particularly in the visible region. If Abbe number falls below the conditional expression (1), the longitudinal chromatic aberration increases at the telephoto end and the optical performance is lowered, which is not favorable. Furthermore, when the first group 10 satisfies the conditional expression (2), the aberrations in the visible region to the near-infrared region are corrected. If Abbe number falls below the conditional expression (2), the longitudinal chromatic aberration increases in the the near-infrared region and the optical performance is lowered in the near-infrared region, which is not favorable. Also, if the fourth group 40 falls below the conditional expression (4), the longitudinal chromatic aberration increases over the entire range of from the wide-angle end to the telephoto end and the optical performance is lowered from the visible region to the near-infrared region, which is not favorable.

The conditional expression (3) relates to the reflective index of the third lens L23 of the second group 20. If the refractive index of the third lens L23 falls below the conditional expression (3), the movement amount of the second group 20 in varying the power increases and it becomes difficult to achieve size-reduction, which is not favorable.

As explained above, according to the zoom lens of the embodiment, the power arrangement is properly established particularly in the first group 10 of the four-group system zoom lens. Therefore, the entire lens length can be reduced while maintaining the aberration characteristic. This realizes a small-size high-performance zoom lens system suited for use on a dome monitoring camera or the like.

EXAMPLE

Specific numerical examples 1 to 8 of the zoom lens according to the embodiment will be collectively described based on the example 1.

FIGS. 9, 10(A) and 10(B) show, as an example 1, specific lens data corresponding to the lens configuration shown in FIG. 1. FIG. 9 shows the basic lens data, FIG. 10(A) shows data relating to aspheric surfaces, and FIG. 10(B) shows data which change along with zooming.

The column of surface number Si of FIG. 9 shows numbers of i-th (i=1 to 23) surfaces to which references are given with gradually increasing as approaching to the image side, and the surface of the constituent element closest to the object side is taken as a first surface. The column of curvature radius Ri shows values of curvature radius (mm) of each i-th surface as counted in order from the object side, correspondingly to the symbols Ri shown in FIG. 1. The column of distance between surfaces Di shows a distance (mm) on the optical axis between the i-th surface Si and the (i+1)-th surface (Si+1) as similarly counted in order from the object side. The columns of Ndj, νdj show respective values of refractive index and Abbe number at the d-line (wavelength: 587.6 nm) of the j-th (j=1-12) optical element as counted in order from the object side. Also, the asterisk "*" attached to the surface number at its left represents that the relevant lens surface is aspheric. Incidentally, because the second and fourth groups 20, 40 are moved along the optical axis when the power varies, the distances between surfaces D5, D10, D15, D21, which are defined frontward/rearward of the respective groups, are variable. Also, in the zoom lens of the example 1, the 20th and 21st surfaces (both surfaces of the third lens L43 of the fourth group) are aspheric. Curvature radiuses near the optical axis are shown as curvature radiuses Ri of these aspheric surfaces.

FIG. 10(B) shows, as data relating to zooming, values of the variable distances between surfaces D5, D10, D15, D21 at wide-angle and telephoto ends. FIG. 10(B) also shows values of paraxial focal length f (mm) of the entire system, F number (FNO.) and angle of view 2ω (ω: half angle of view) at the wide-angle and telephoto ends.

In FIG. 10(A), the symbol "E," in the numeral shown as aspheric data, represents that the following numeral is a "power exponent" having 10 as a base and the preceding numeral to "E" is multiplied by a numeral value represented by the exponential function having 10 as a base. For example, "1.0E-02" means "1.0×10$^{-2}$."

As the aspheric data, respective factors $A_i$ and K in the aspheric surface shape expression represented by the following expression (A) are listed. 'Z' represents a length (mm) of a vertical line drawn from a point, on the aspheric surface and located at a height h with respect to the optical axis, onto a tangential plane to the apex of the aspheric surface (a plane vertical to the optical axis). The zoom lens of example 1 is expressed by effectively using third to twentieth order factors $A_3$ to $A_{20}$ where the respective aspheric surfaces have aspheric factors $A_i$.

$$Z = C \cdot h^2 / \{1 + (1 - K \cdot C^2 \cdot h^2)^{1/2}\} + \Sigma A_i \cdot h^i \quad (A)$$

(i=3 to n, n: integer equal to or greater than 3) where

Z: depth of the aspheric surface (mm)

h: distance (height) of from the optical axis to the lens surface (mm)

K: conical constant

C: paraxial curvature=1/R (R: paraxial curvature radius)

Ai: i-th order aspheric factor

Similarly to example 1, FIGS. 11, 12(A) and 12(B) show the lens data of the zoom lens according to example 2. Likewise, FIGS. 13, 14(A) and 14(B) show the lens data of the zoom lens according to example 3. Likewise, FIGS. 15, 16(A) and 16(B) show the lens data of the zoom lens according to example 4. Likewise, FIGS. 17, 18(A) and 18(B) show the lens data of the zoom lens according to example 5. Likewise, FIGS. 19, 20(A) and 20(B) show the lens data of the zoom lens according to example 6. Likewise, FIGS. 21, 22(A) and 22(B) show the lens data of the zoom lens according to example 7. Likewise, FIGS. 23, 24(A) and 24(B) show the lens data of the zoom lens according to example 8.

Similarly to the example 1, the both surfaces of the third lens L43 of the fourth group 40 are aspheric in each of the examples 2 to 8. In the example 3, both surfaces of the first lens L32 of the third group 30 are aspheric, in addition to the above.

FIG. 25 collectively shows values relating to the conditional expressions (1) to (4) on an example basis. As shown in FIG. 25, the zoom lenses according to the examples 1 to 3 and 5 to 8 are respectively fallen within the numerical ranges of the conditional expressions. Incidentally, the example 4 satisfies only the conditional expressions (1), (3) but does not satisfy the conditional expressions (2), (4).

FIGS. 26(A) to 26(C) respectively show spherical aberration, astigmatism and distortion of the zoom lens of the example 1 at the wide end. FIG. 27(A) to 27(C) show such aberrations at the telephoto end. In each of the aberration diagrams, aberration is shown at the d-line (wavelength: 587.6 nm) taken as a reference wavelength. In the spherical aberration diagram, aberration is also shown at a wavelength 880 nm in the near-infrared region. In the astigmatism diagram, the solid line represents an aberration in a sagittal direction while the broken line an aberration in a tangential direction. FNO. represents an F value while ω represents a half angle-of-view.

Figure 28A:
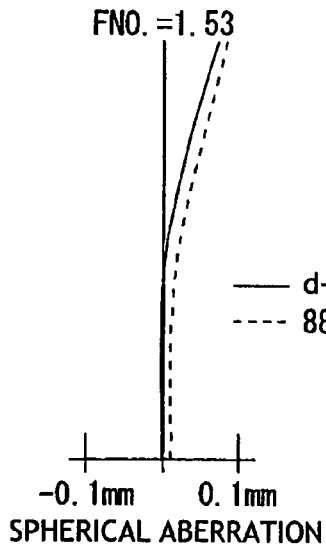
FIG. 28 is an aberration diagram showing various aberrations at the wide-angle end of the zoom lens according the example 2, wherein (A) shows spherical aberration, (B) shows astigmatism and (C) shows distortion.
Figure 28B:
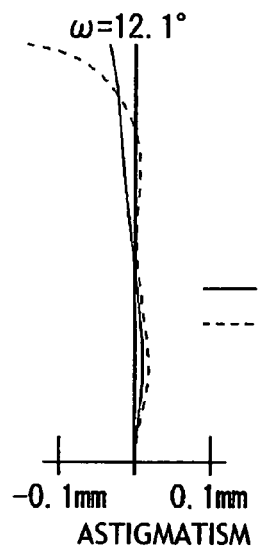
Figure 28C:
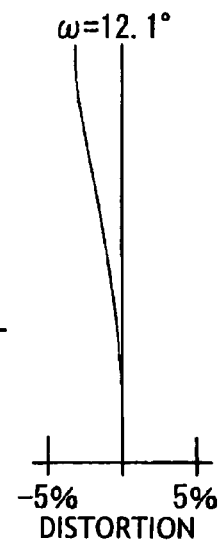
Figure 29A:
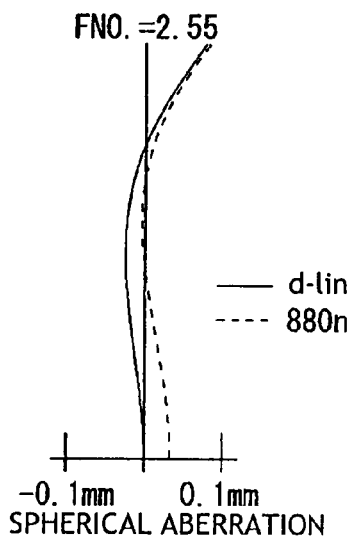
FIG. 29 is an aberration diagram showing various aberrations at the telephoto end of the zoom lens according the example 2, wherein (A) shows spherical aberration, (B) shows astigmatism and (C) shows distortion.
Figure 29B:
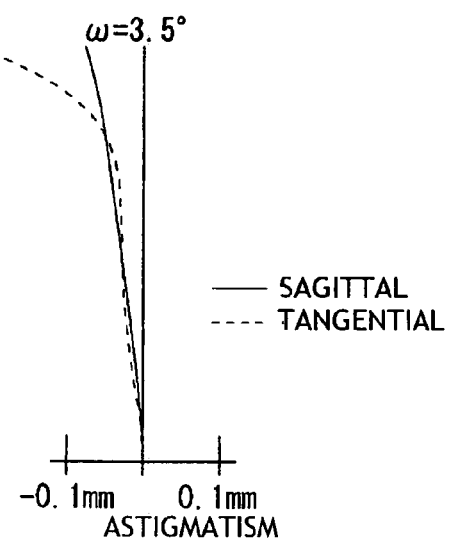
Figure 29C:
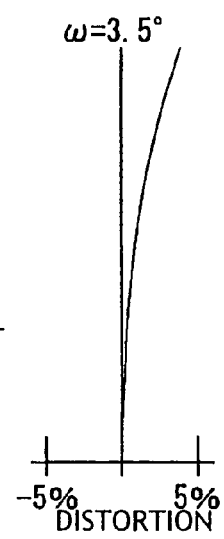
Figure 30A:
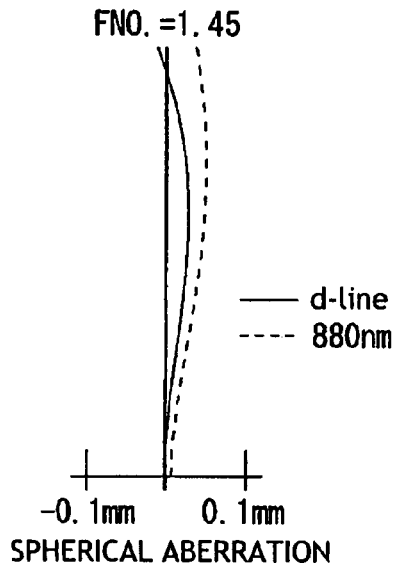
FIG. 30 is an aberration diagram showing various aberrations at the wide-angle end of the zoom lens according the example 3, wherein (A) shows spherical aberration, (B) shows astigmatism and (C) shows distortion.
Figure 30B:
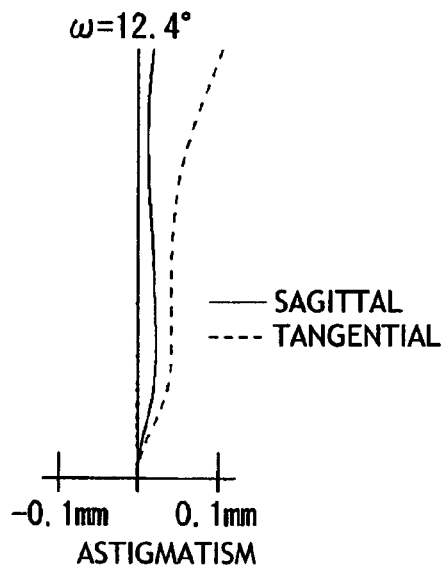
Figure 30C:
Figure 31A:
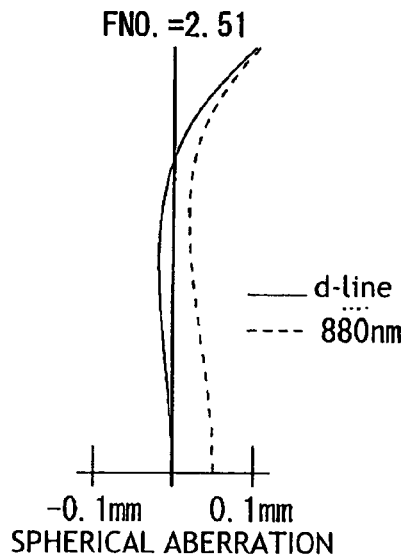
FIG. 31 is an aberration diagram showing various aberrations at the telephoto end of the zoom lens according the example 3, wherein (A) shows spherical aberration, (B) shows astigmatism and (C) shows distortion.
Figure 31B:
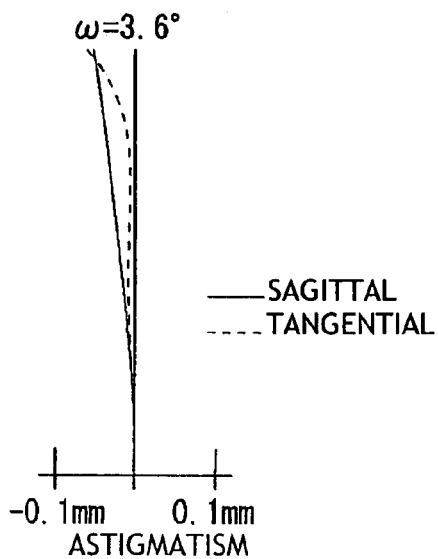
Figure 31C:
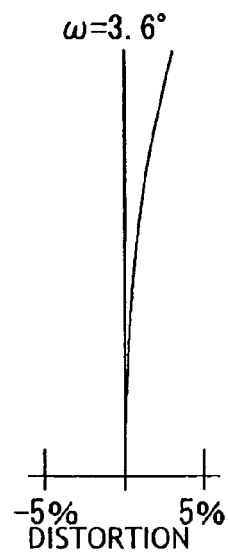
Figure 34A:
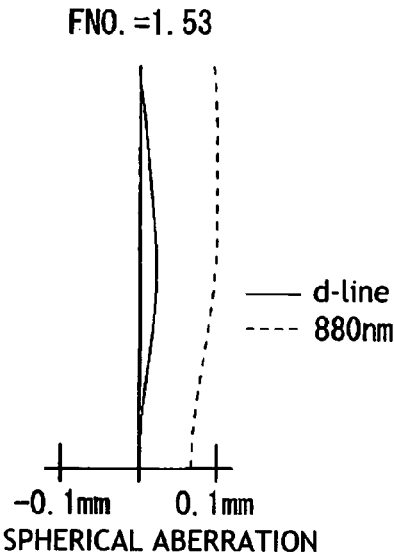
FIG. 34 is an aberration diagram showing various aberrations at the wide-angle end of the zoom lens according the example 4, wherein (A) shows spherical aberration, (B) shows astigmatism and (C) shows distortion.
Figure 34B:
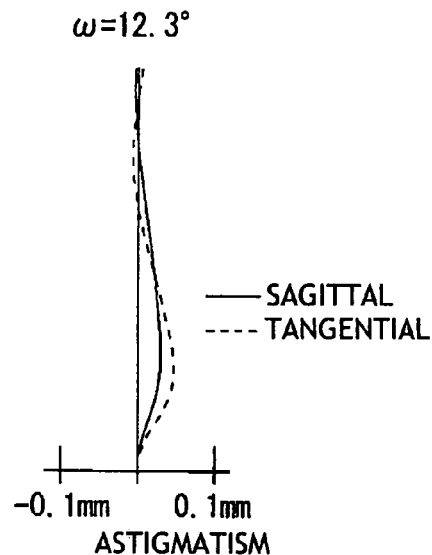
Figure 34C:
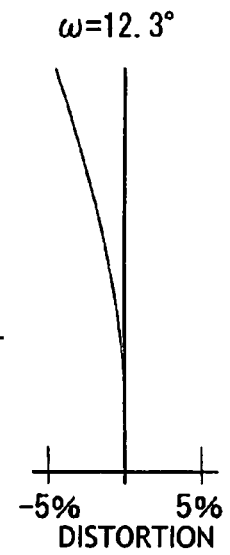
Figure 35A:
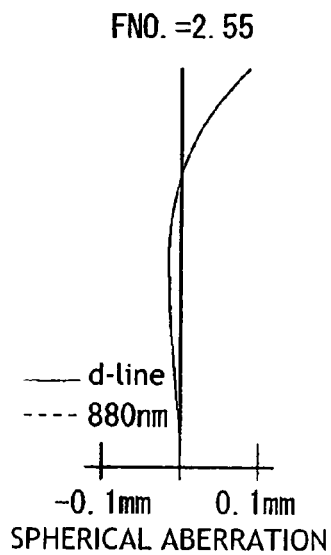
FIG. 35 is an aberration diagram showing various aberrations at the telephoto end of the zoom lens according the example 4, wherein (A) shows spherical aberration, (B) shows astigmatism and (C) shows distortion.
Figure 35B:
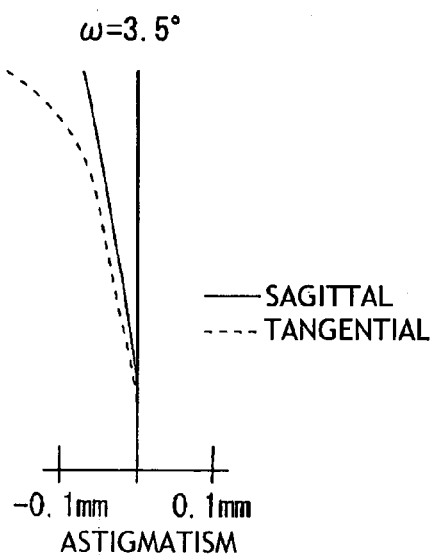
Figure 35C:
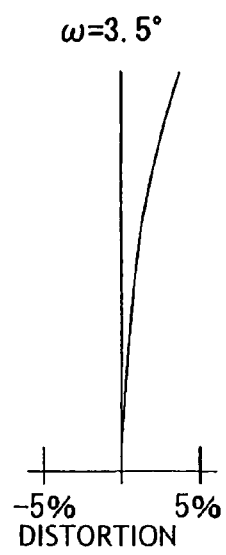
Figure 36A:
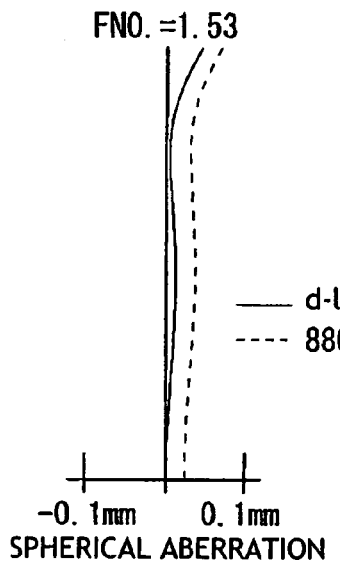
FIG. 36 is an aberration diagram showing various aberrations at the wide-angle end of the zoom lens according the example 5, wherein (A) shows spherical aberration, (B) shows astigmatism and (C) shows distortion.
Figure 36B:
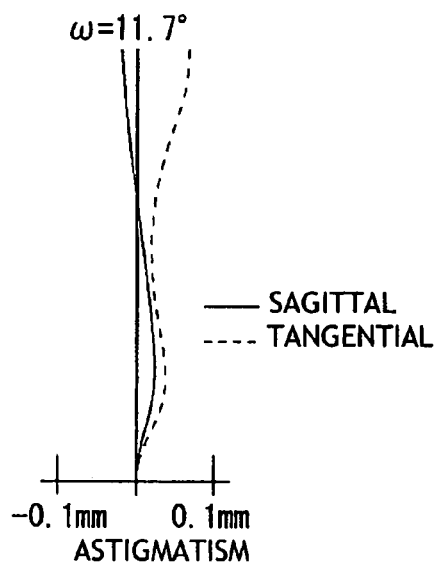
Figure 36C:
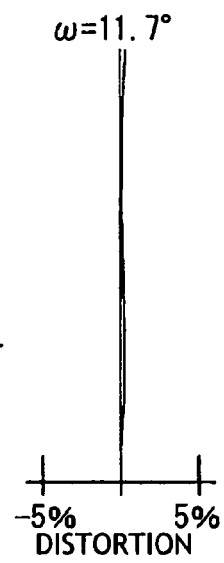
Figure 37A:
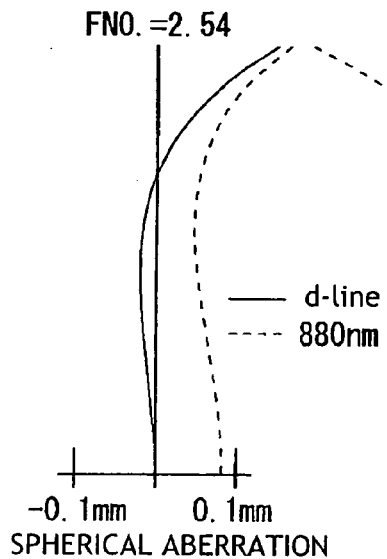
FIG. 37 is an aberration diagram showing various aberrations at the telephoto end of the zoom lens according the example 5, wherein (A) shows spherical aberration, (B) shows astigmatism and (C) shows distortion.
Figure 37B:
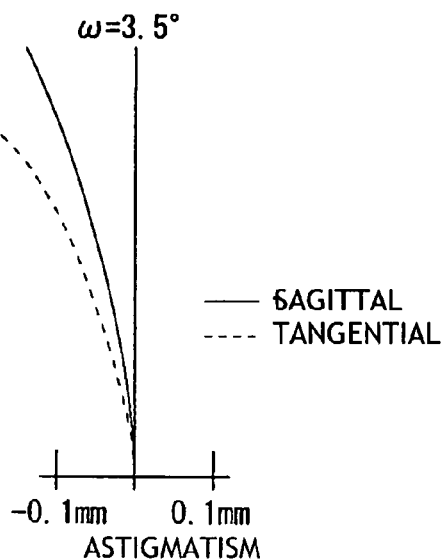
Figure 37C:
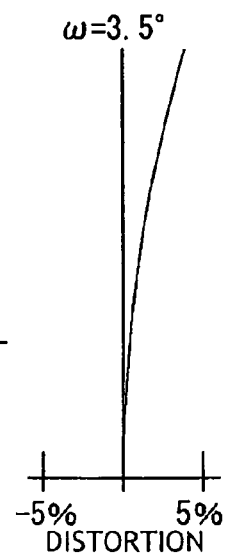
Figure 38A:
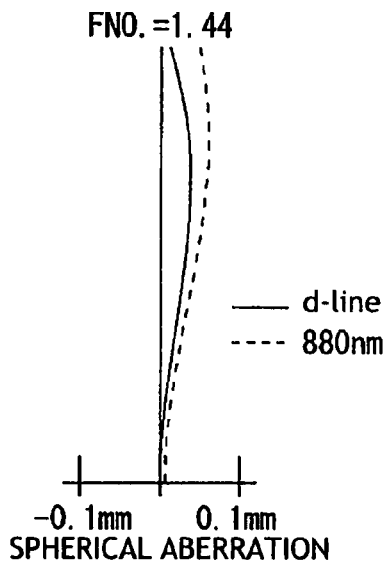
FIG. 38 is an aberration diagram showing various aberrations at the wide-angle end of the zoom lens according the example 6, wherein (A) shows spherical aberration, (B) shows astigmatism and (C) shows distortion.
Figure 38B:
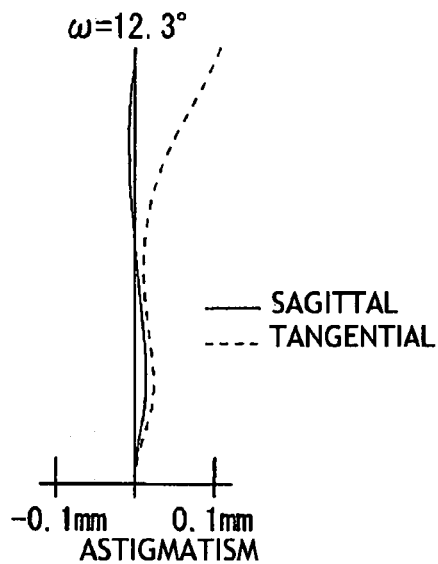
Figure 38C:
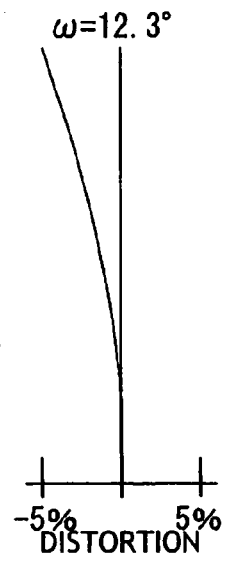
Figure 39A:
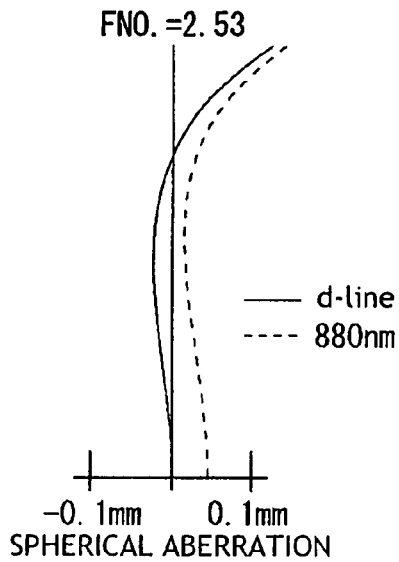
FIG. 39 is an aberration diagram showing various aberrations at the telephoto end of the zoom lens according the example 6, wherein (A) shows spherical aberration, (B) shows astigmatism and (C) shows distortion.
Figure 39B:
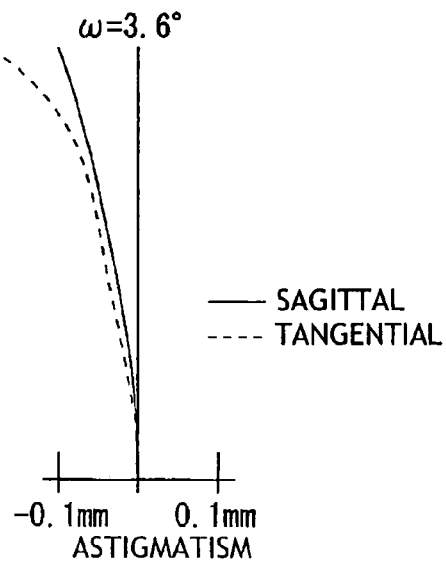
Figure 39C:
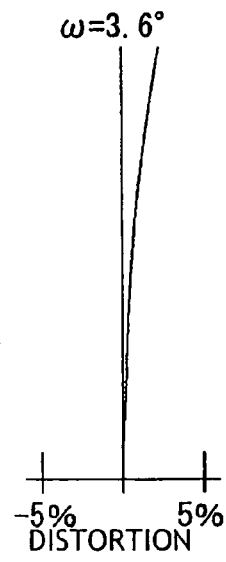
Figure 40A:
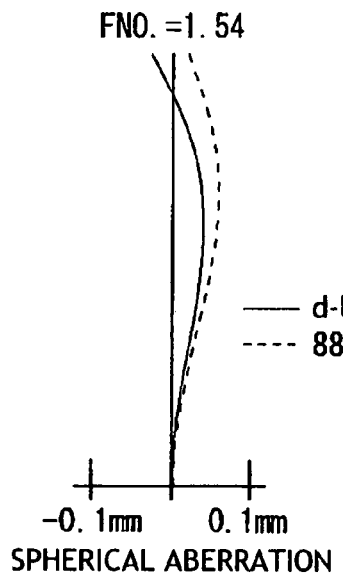
FIG. 40 is an aberration diagram showing various aberrations at the wide-angle end of the zoom lens according the example 7, wherein (A) shows spherical aberration, (B) shows astigmatism and (C) shows distortion.
Figure 40B:
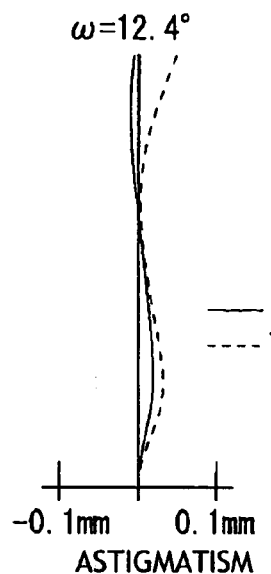
Figure 40C:
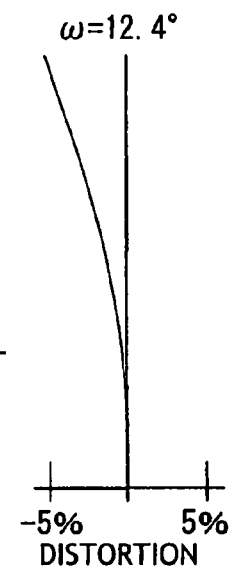
Figure 41A:
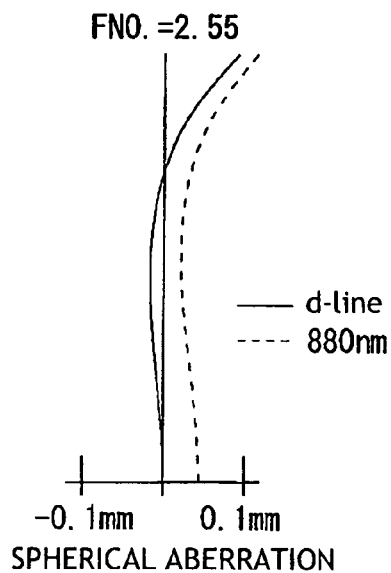
FIG. 41 is an aberration diagram showing various aberrations at the telephoto end of the zoom lens according the example 7, wherein (A) shows spherical aberration, (B) shows astigmatism and (C) shows distortion.
Figure 41B:
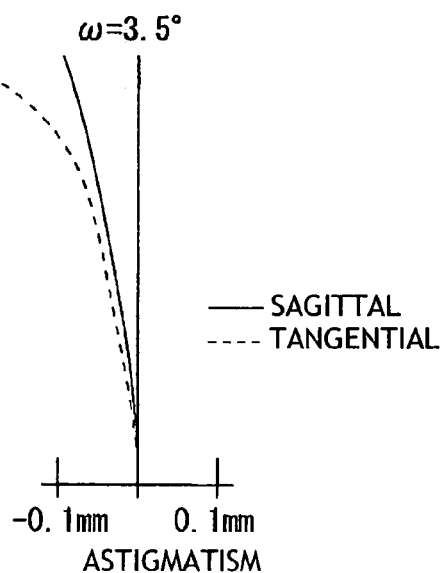
Figure 41C:
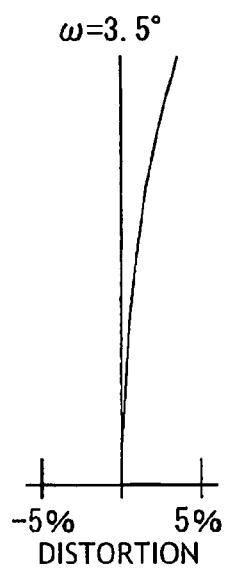
Figure 42A:
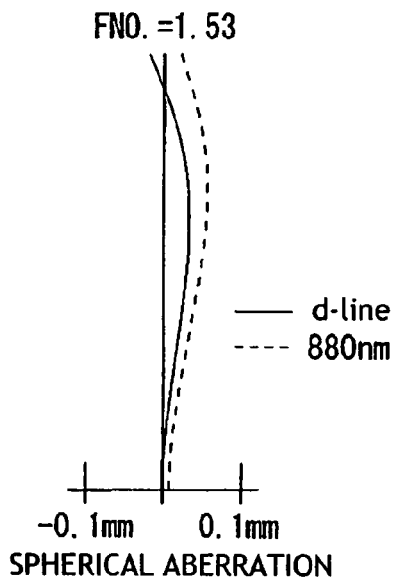
FIG. 42 is an aberration diagram showing various aberrations at the wide-angle end of the zoom lens according the example 8, wherein (A) shows spherical aberration, (B) shows astigmatism and (C) shows distortion.
Figure 42B:
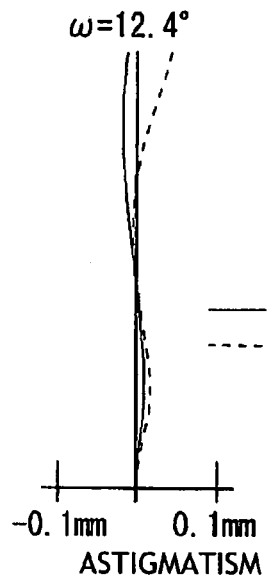
Figure 42C:
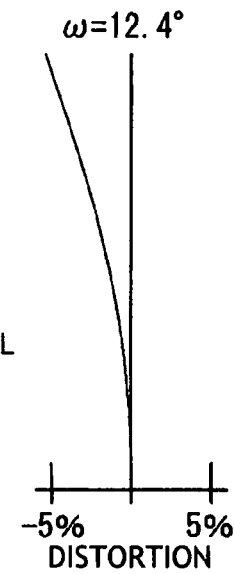
Figure 43A:
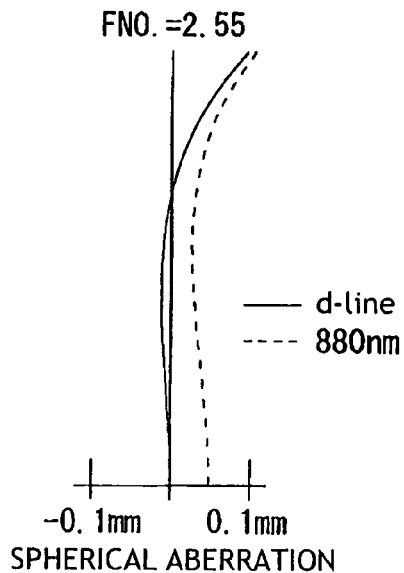
FIG. 43 is an aberration diagram showing various aberrations at the telephoto end of the zoom lens according the example 8, wherein (A) shows spherical aberration, (B) shows astigmatism and (C) shows distortion.
Figure 43B:
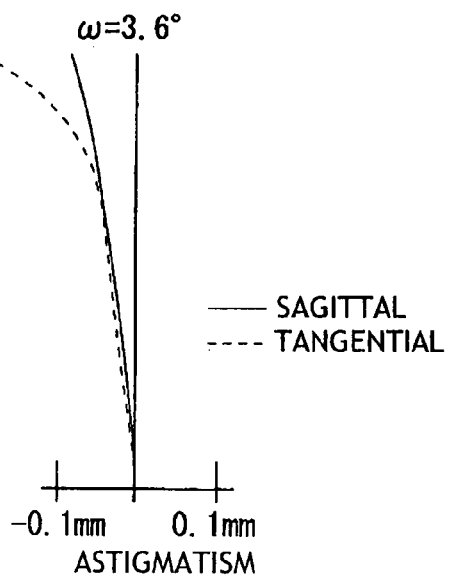
Figure 43C:
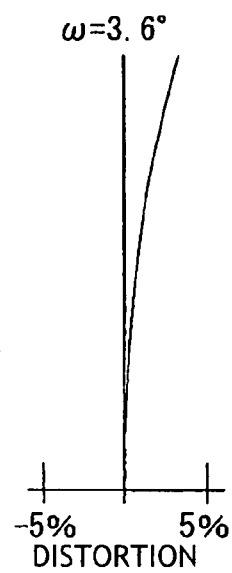

Likewise, the aberrations on the zoom lens according to example 2 are shown in FIGS. 28(A) to 28(C) (at wide-angle end) and 29(A) to 29(C) (at telephoto end). Likewise, the aberrations on the zoom lens according to example 3 are shown in FIGS. 30(A) to 30(C) (at wide-angle end) and 31(A) to 31(C) (at telephoto end). Likewise, the aberrations on the zoom lens according to example 4 are shown in FIGS. 34(A) to 34(C) (at wide-angle end) and 35(A) to 35(C) (at telephoto end). Likewise, the aberrations on the zoom lens according to example 5 are shown in FIGS. 36(A) to 36(C) (at wide-angle end) and 37(A) to 37(C) (at telephoto end). Likewise, the aberrations on the zoom lens according to example 6 are shown in FIGS. 38(A) to 38(C) (at wide-angle end) and 39(A) to 39(C) (at telephoto end). Likewise, the aberrations on the zoom lens according to example 7 are shown in FIGS. 40(A) to 40(C) (at wide-angle end) and 41(A) to 41(C) (at telephoto end). Likewise, the aberrations on the zoom lens according to example 8 are shown in FIGS. 42(A) to 42(C) (at wide-angle end) and 43(A) to 43(C) (at telephoto end).

Figure 32A:
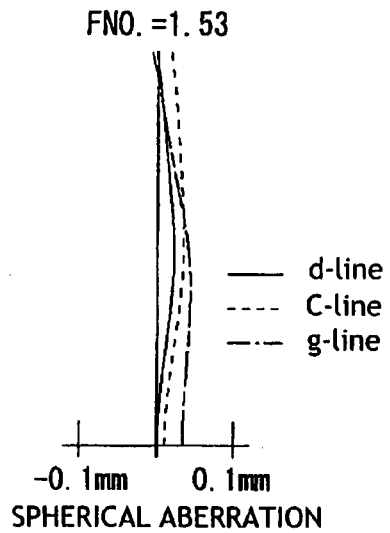
FIG. 32 is an aberration diagram showing aberrations (in the visible region) at the wide-angle end of the zoom lens according the example 4, wherein (A) shows spherical aberration, (B) shows astigmatism and (C) shows distortion.
Figure 32B:
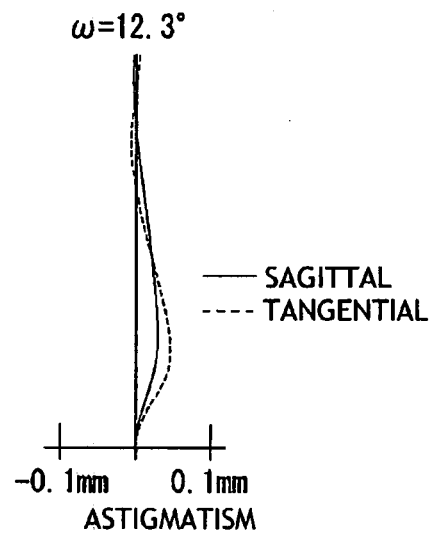
Figure 32C:
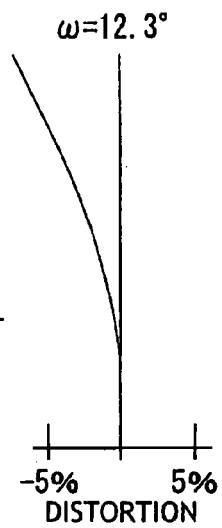
Figure 33A:
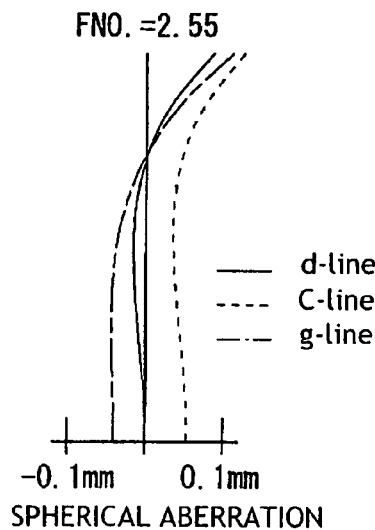
FIG. 33 is an aberration diagram showing aberrations (in the visible region) at the telephoto end of the zoom lens according the example 4, wherein (A) shows spherical aberration, (B) shows astigmatism and (C) shows distortion.
Figure 33B:
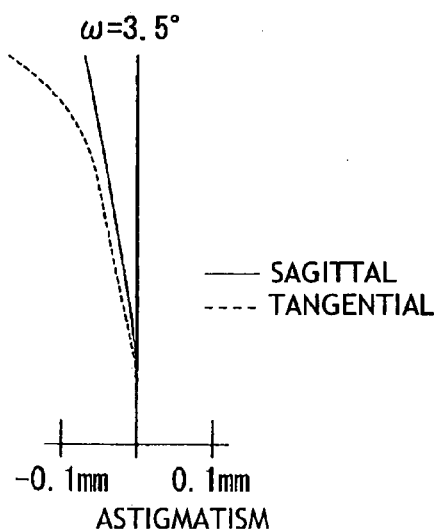
Figure 33C:
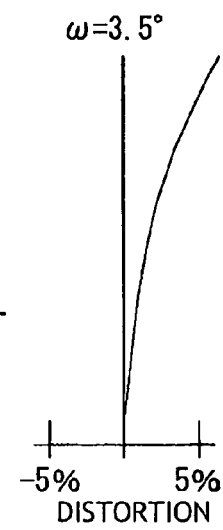

For the zoom lens according to the example 4, aberrations only in the visible region are shown in FIGS. 32(A) to 32(C) (at wide-angle end) and in FIGS. 33(A) to 33(C) (at telephoto end), in addition to those in the visible and near-infrared regions (in FIGS. 34(A) to 34(C) and 35(A) to 35(C)). These aberration diagrams are shown similarly to those of the example 1 excepting that aberration is at the g-line (wavelength: 435.8 nm) and at the C-line (wavelength: 656.3 nm) in place of at the wavelength 880 nm in the spherical aberration diagram.

As can be seen from the numerical-value data and aberration diagrams, aberrations are well corrected to realize a small-sized high-performance zoom lens for suitable use on a dome monitoring camera or the like. Also, as can be seen from the result of example 4, since at least one lens of the first group 10 satisfies the conditional expression (1), high optical performance can be ensured particularly in the visible region. Accordingly, the example 4 is suited for use only in the visible region. Furthermore, as can be seen from the result of other than example 4, since at least one lens of the first group 10 satisfies the conditional expression (2), high optical performance can be ensured over from the visible to near-infrared region.

The invention is not limited to the embodiment and examples but can be modified in various ways. For example, the curvature radius, the surface-to-surface spacing, the refractive index, etc. of the lens component are not limited to the values shown in the numerical examples but can take other values.

What is claimed is:

1. A zoom lens comprising, in order from an object side:
a first group having a positive refractive power;
a second group having a negative refractive power;
a diaphragm;
a third group having a positive refractive; and
a fourth group following the third group, wherein:
when a power of the zoom lens varies from a wide-angle end to a telephoto end, the second group is moved along an optical axis toward an image side with the first and third groups fixed to the optical axis so as to vary the power and the fourth group is moved along the optical axis to perform correction of a position of the image plane, which is associated with the variation of the power, and focusing, and
the first group comprises, in order from the object side, a first lens of the first group having a positive refractive power, a second lens of the first group having a positive refractive power and a third lens of the first group having a negative refractive power.

2. The zoom lens according to claim 1, wherein a combined refractive power of the second and third lenses of the first group is negative.

3. The zoom lens according to claim 1, wherein the fourth group has a positive refractive power.

4. The zoom lens according to claim 1, wherein the second and third lenses of the first group form a cemented lens.

5. The zoom lens according to claim 1, wherein at least one lens of the first group satisfies the following conditional expression:

$$vd > 50 \quad (1)$$

where vd denotes Abbe number at d-line having 587.6 nm in wavelength.

6. The zoom lens according to claim 1, wherein at least one lens of the first group satisfies the following conditional expression:

$$vd > 75 \quad (2)$$

where vd denotes Abbe number at d-line (wavelength: 587.6 nm).

7. The zoom lens according to claim 1, wherein the second group comprises, in order from the object side, a first lens of the second group having a negative refractive power, a second lens of the second group having a biconcave shape and a third lens of the second group having a positive refractive power.

8. The zoom lens according to claim 7, wherein the second group further comprises a lens having a positive or negative refractive power on the object side of the first lens of the second group or on the image side of the third lens of the second group.

9. The zoom lens according to claim 7, wherein the third lens of the second group satisfies the following conditional expression:

$$N23 > 1.75 \quad (3)$$

where N23 denotes a refractive index of the third lens of the second group at d-line having 587.6 nm in wavelength.

10. The zoom lens according to claim 1, wherein the third group comprises at least one lens having a positive refractive power and at least one lens having a negative refractive power.

11. The zoom lens according to claim 10, wherein the third group comprises, in order from the object side, a first single lens of the third group having a positive refractive power and a second single lens of the third group having a negative refractive power with a concave surface directed to the object side.

12. The zoom lens according to claim 10, wherein the third group comprises a cemented lens formed of a first lens of the third group having a positive refractive power and a second lens of the third group having a negative refractive power with the first and second lenses of the third group arranged in order from the object side.

13. The zoom lens according to claim 10, wherein the least one lens of the third group having the positive refractive power has at least one aspheric surface.

14. The zoom lens according to claim 1, wherein:
the fourth group comprises, in order from the object side, a first lens of the fourth group having a negative refractive power with a concave surface directed to the object side, a second lens of the fourth group having a positive refractive power and a third lens of the fourth group having a positive refractive power, and
at least one surface of the lenses of the fourth group having the positive refractive power is aspheric.

15. The zoom lens according to claim 14, wherein the third lens of the fourth group has at least one aspheric surface.

16. The zoom lens according to claim 1, wherein at least one lens of the fourth group satisfies the following conditional expression:

$$vd > 75 \qquad (4)$$

where vd denotes Abbe number at d-line having 587.6 nm in wavelength.

* * * * *